(12) United States Patent
Elliott et al.

(10) Patent No.: US 8,720,326 B2
(45) Date of Patent: May 13, 2014

(54) SEALING HEAD FOR MODULAR STEEL STRAPPING MACHINE

(71) Applicant: Illinois Tool Works Inc., Glenview, IL (US)

(72) Inventors: Dustin D. Elliott, Grayslake, IL (US); Christopher S. Krohn, Grayslake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/837,820

(22) Filed: Mar. 15, 2013

(65) Prior Publication Data

US 2013/0284035 A1 Oct. 31, 2013

Related U.S. Application Data

(60) Provisional application No. 61/637,903, filed on Apr. 25, 2012.

(51) Int. Cl.
*B65B 13/32* (2006.01)
*B23K 9/12* (2006.01)
*B23K 11/11* (2006.01)
*B23K 9/00* (2006.01)

(52) U.S. Cl.
CPC . *B65B 13/32* (2013.01); *B23K 9/12* (2013.01); *B23K 11/115* (2013.01); *B23K 9/0035* (2013.01)
USPC ............................ 100/33 R; 219/57; 219/136

(58) Field of Classification Search
CPC ....................................................... B65B 13/32
USPC ........ 100/26, 29, 30, 33 R; 53/589; 140/93.2; 219/56, 57, 78.15, 86.1, 87, 89, 136
See application file for complete search history.

(56) References Cited

U.S. PATENT DOCUMENTS

| 2,882,814 A | * | 4/1959 | Winkler et al. | 100/25 |
| 3,327,618 A | * | 6/1967 | Cook | 100/4 |
| 3,674,972 A | * | 7/1972 | Stahnke | 219/56 |
| 3,767,885 A | | 10/1973 | Fryer | |

(Continued)

FOREIGN PATENT DOCUMENTS

| GB | 547595 A | 9/1942 |
| WO | 2007074372 A2 | 7/2007 |

OTHER PUBLICATIONS

International Search Report for PCT/UA2013/037757 dated Jul. 16, 2013.

*Primary Examiner* — Jimmy T Nguyen

(57) ABSTRACT

A sealing head for a strapping machine welds steel strapping material to itself in an end-to-end weld. The sealing head includes a body, a drive, an end grip at the inlet to the body, a cutter, a grip clamp and a loop grip downstream of the end grip. The loop grip is carried on a carriage that is movable in a direction along the strap path. A leading end of strap is secured by the end grip and a loop portion of the strap is gripped by the loop grip and severed by the cutter to form a loop end. The loop end is secured by the grip clamp. The loop grip carriage moves the loop end toward the leading end as current is passed though the loop end and the leading end to weld the ends to one another in an end-to-end weld.

17 Claims, 34 Drawing Sheets

(56) References Cited

U.S. PATENT DOCUMENTS

| | | | | |
|---|---|---|---|---|
| 4,037,073 A | * | 7/1977 | Becker | 219/92 |
| 4,154,158 A | * | 5/1979 | Leslie et al. | 100/2 |
| 6,517,652 B1 | * | 2/2003 | Gratz | 156/73.5 |

* cited by examiner

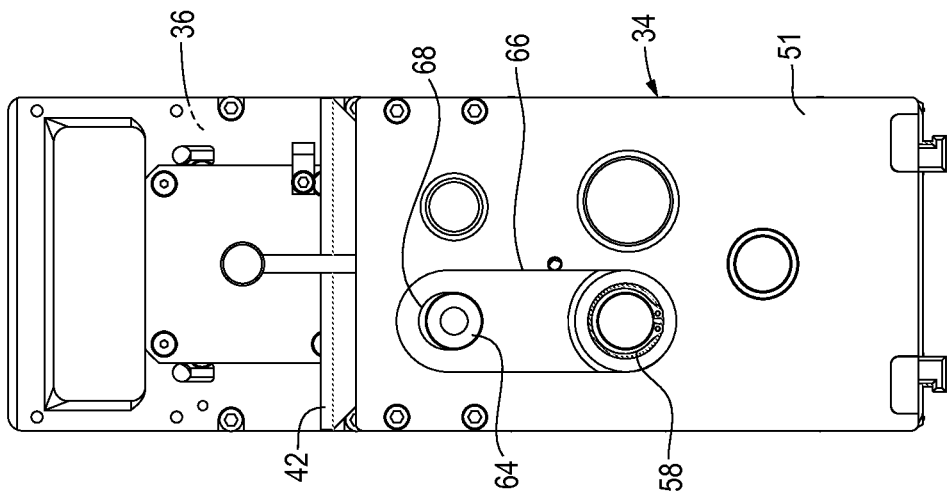
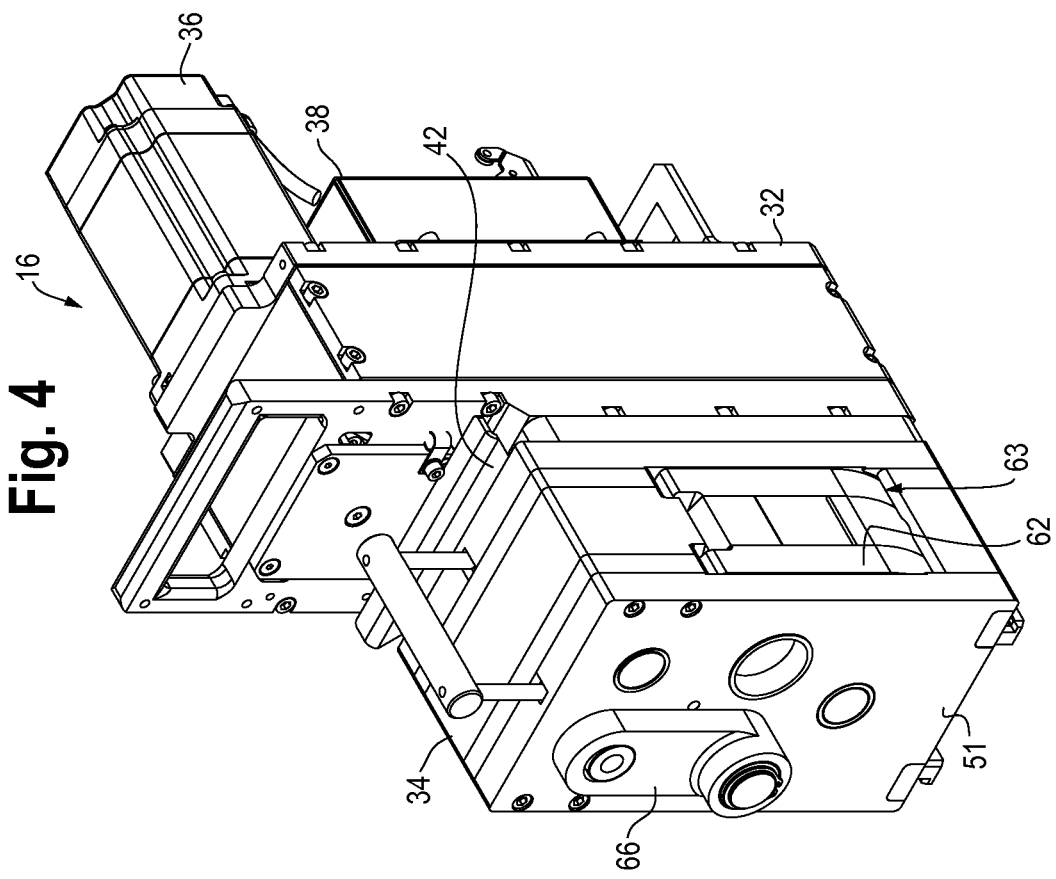

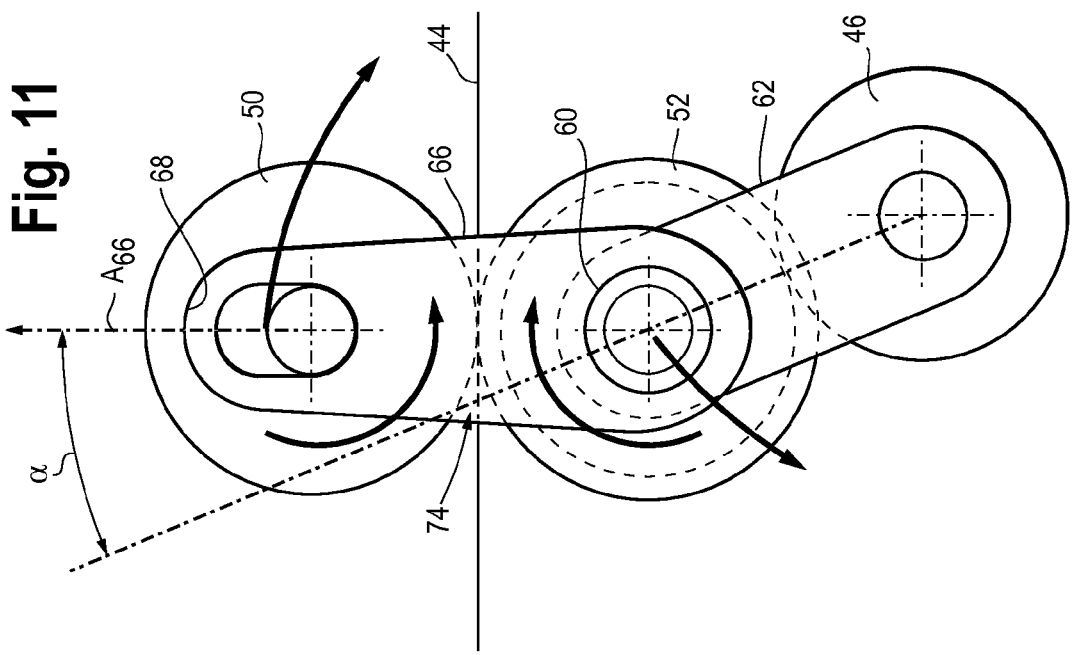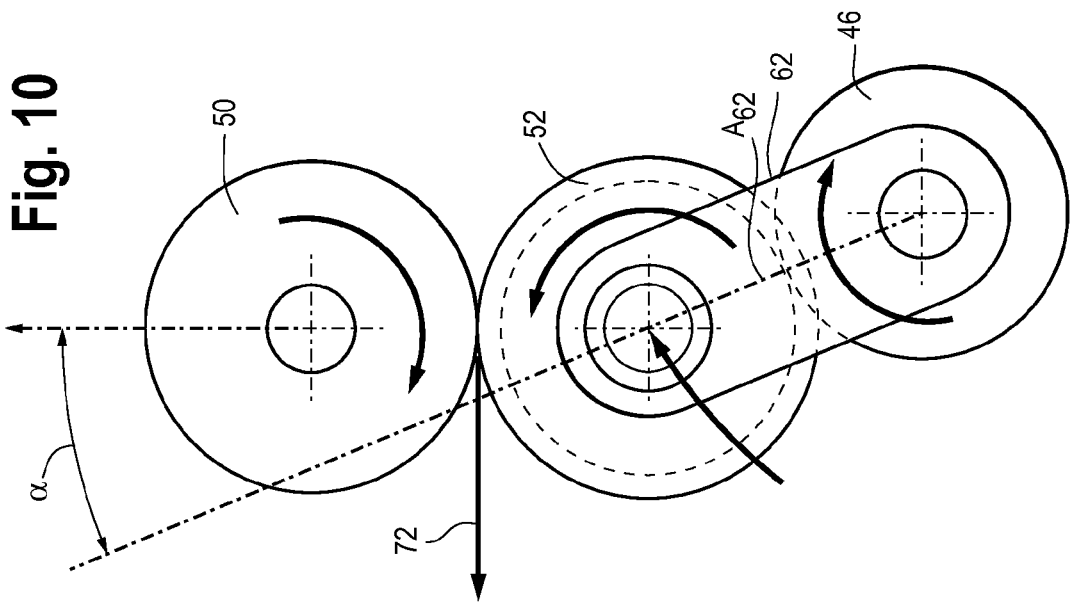

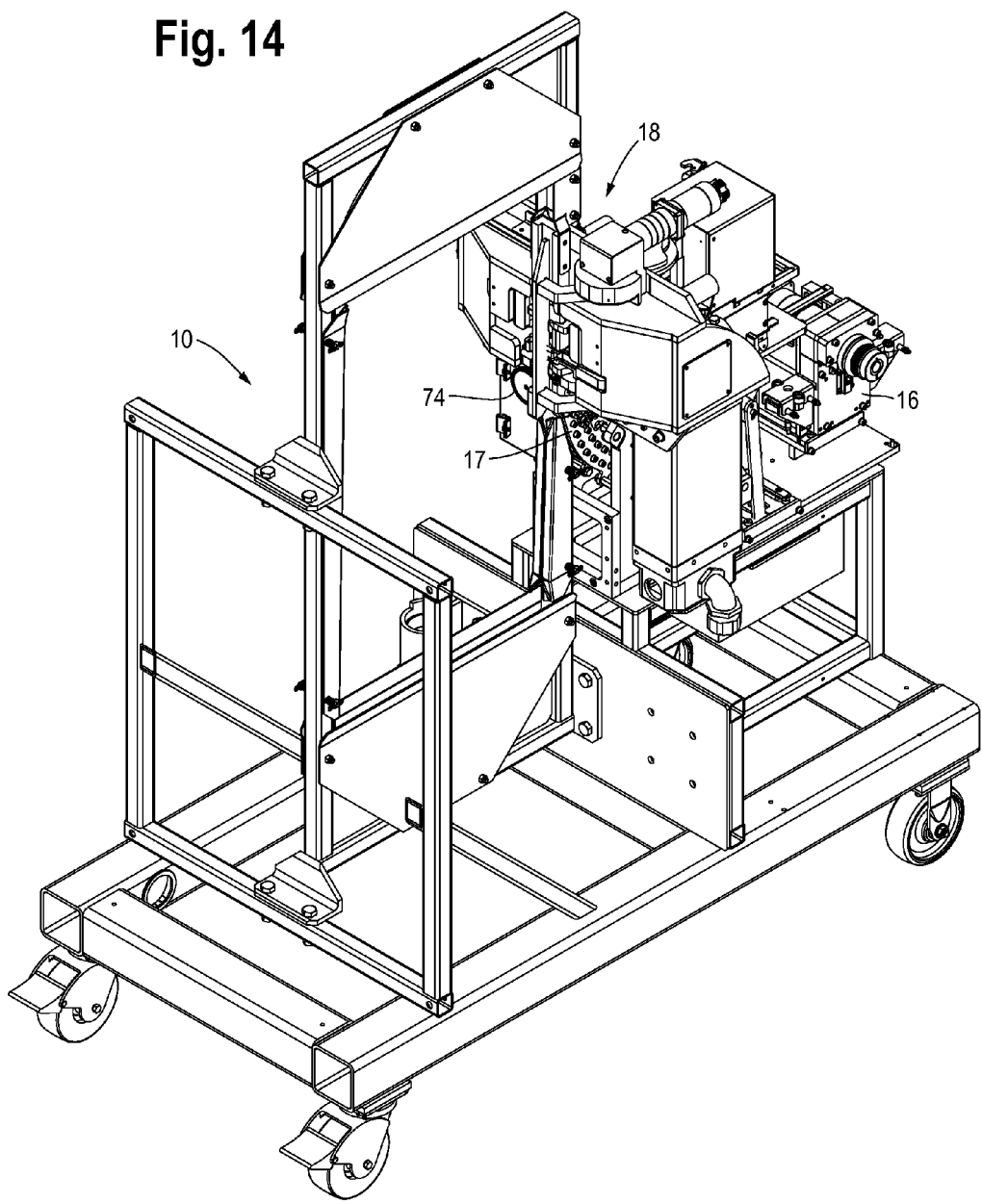

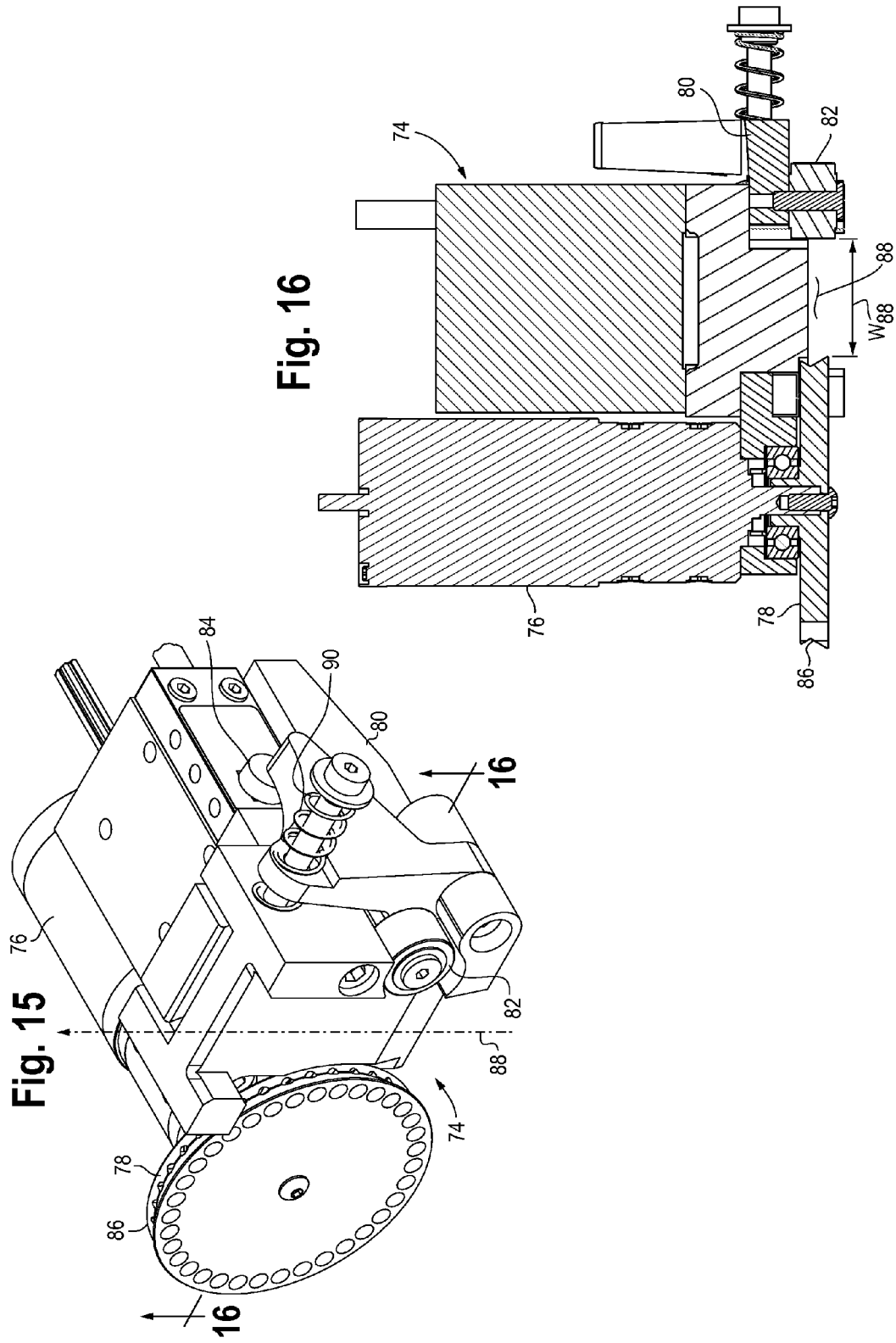

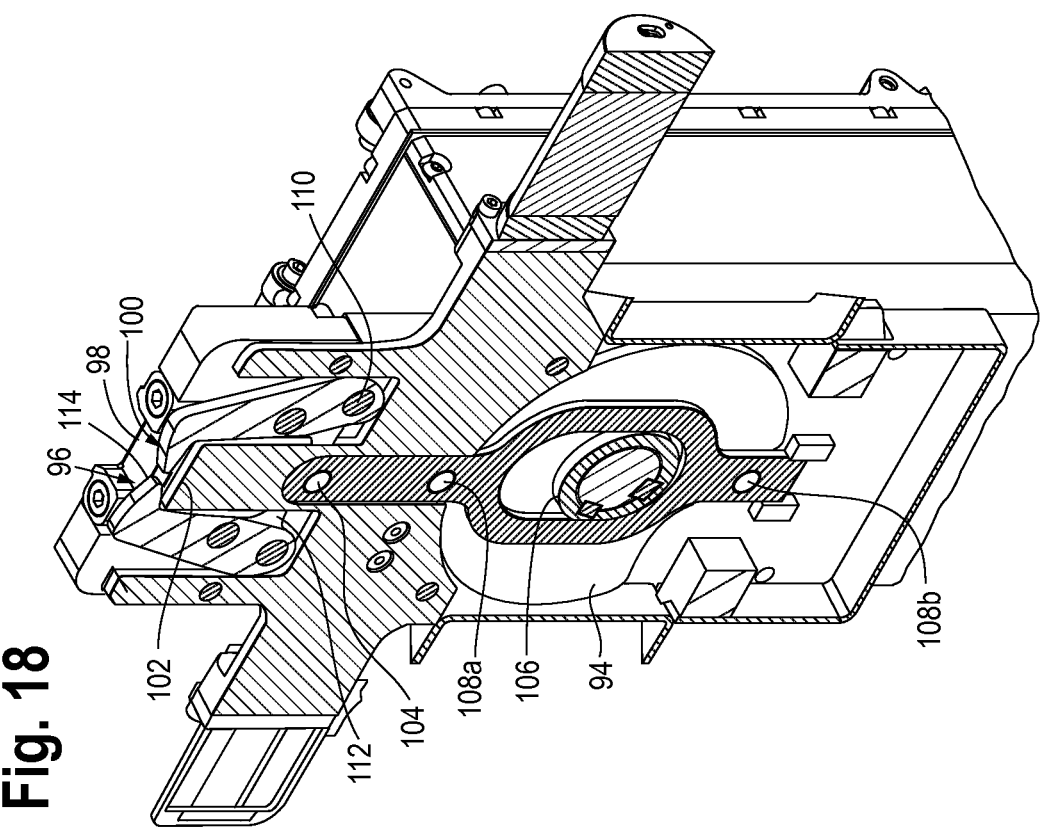

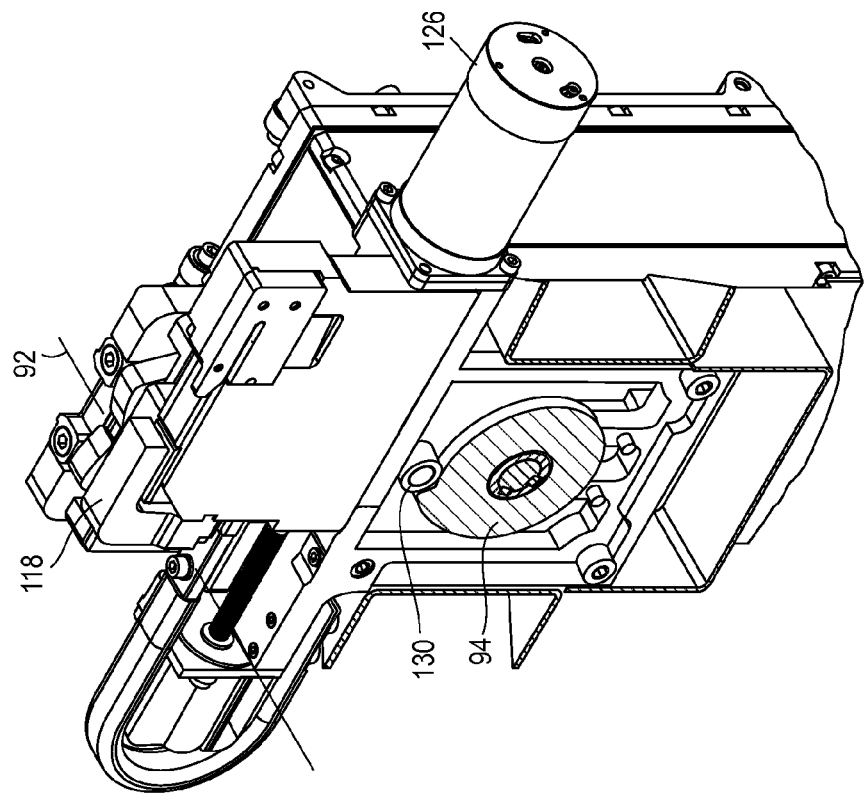
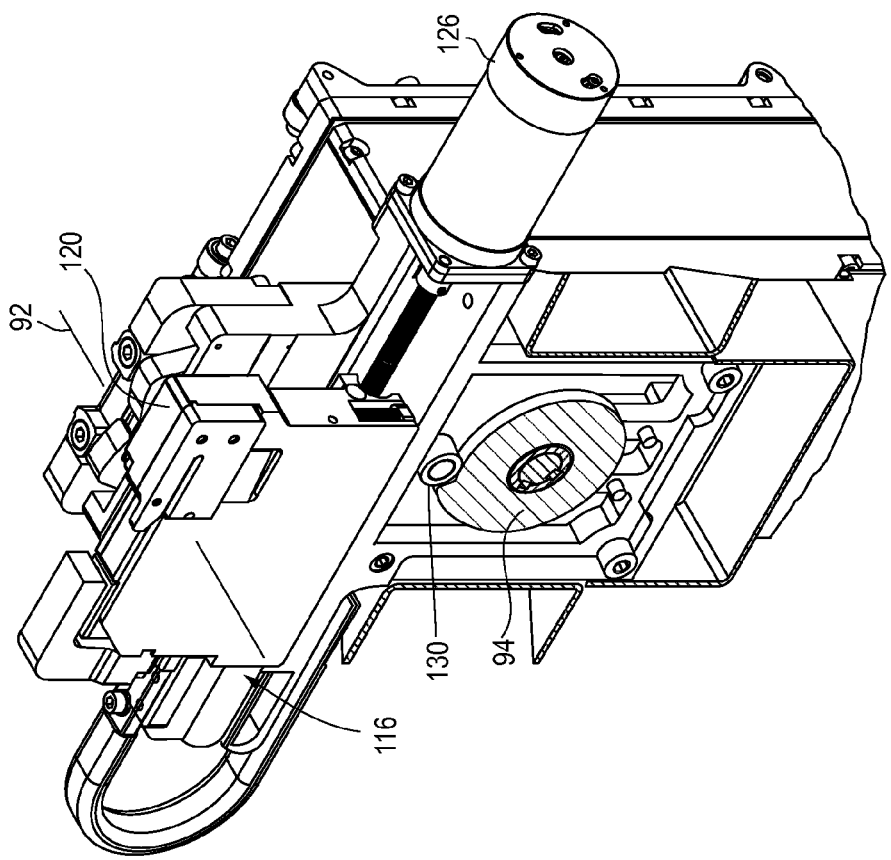

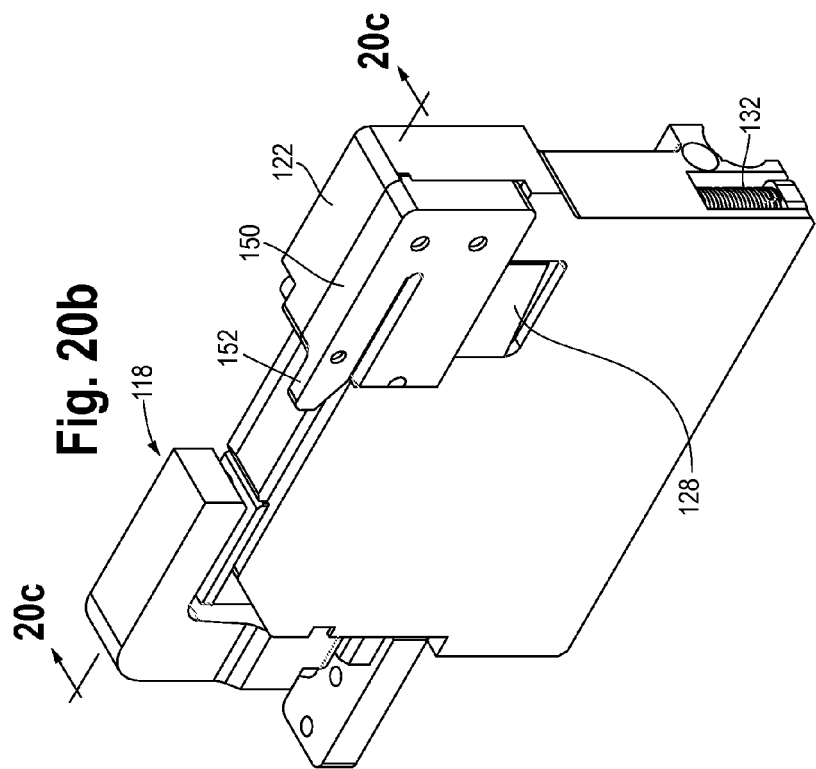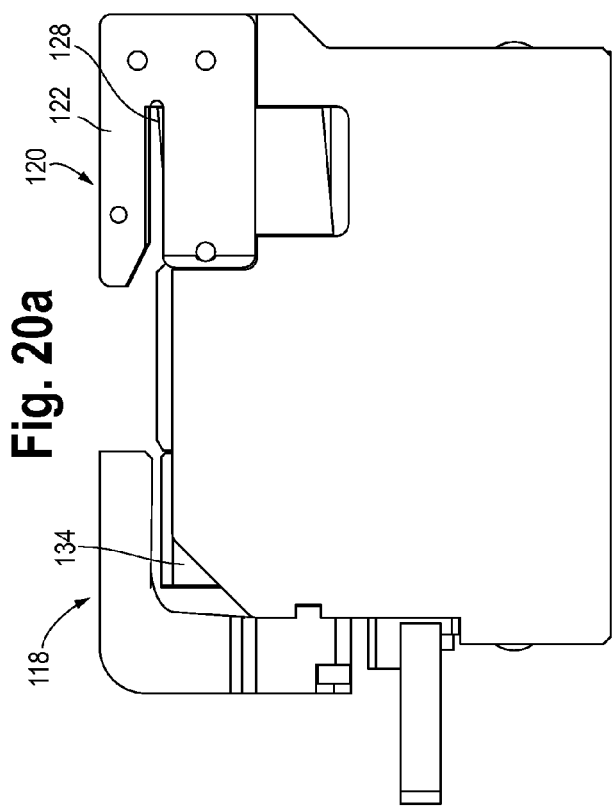

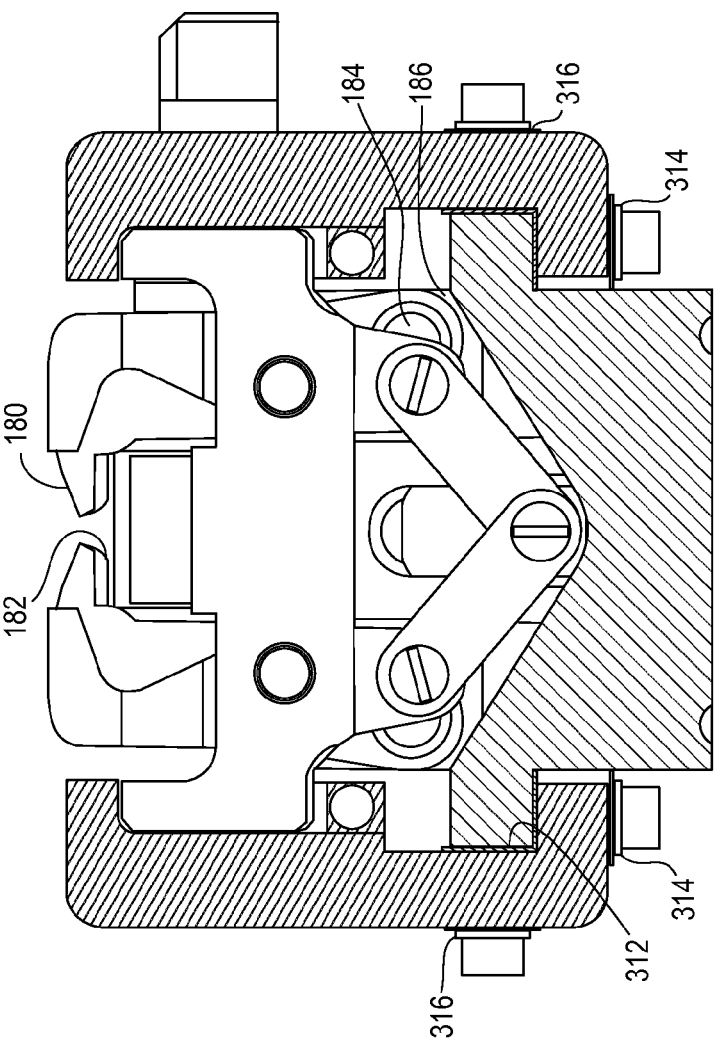
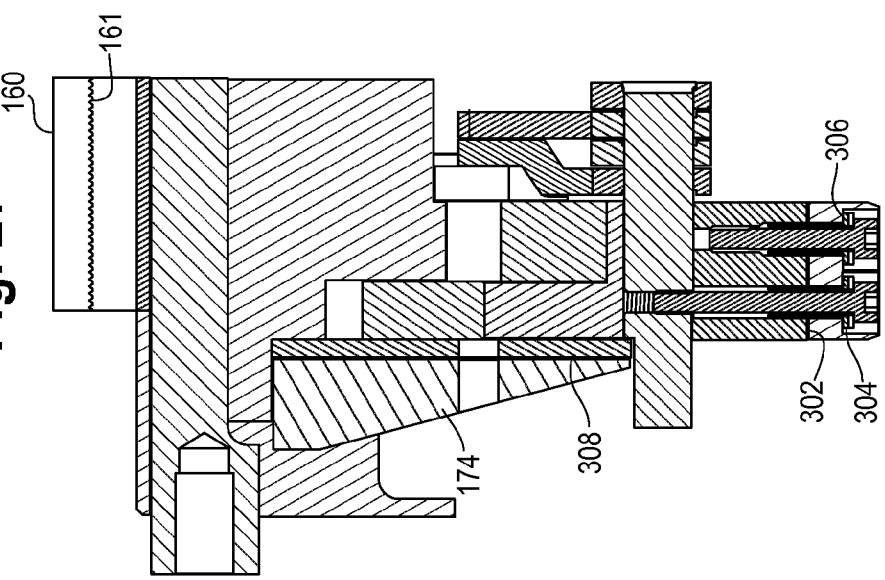

SEALING HEAD FOR MODULAR STEEL STRAPPING MACHINE

BACKGROUND

Strapping machines, both automatic and manual, are known for securing straps around loads.

Steel strap can be used to secure loads, such as structural steel members, pipe, steel coils, metal plates and like materials that could otherwise overload or compromise the integrity and/or strength of plastic strap material. Typically, a hand-held tensioning tool is positioned on the load and the strap is positioned in the tool and tensioned. A seal is then applied to the strap to secure the tensioned strap around the load.

The seals can be of the crimp-type, in which a seal element is positioned around overlying courses of strap material and crimped onto the strap. Alternately, a crimp-less seal, which uses a set of interlocking cuts in the strap can be used. Alternately still, a spot weld can be used to join the two ends of the strap. The hand-held tools can be fully manual or can be powered, such as by pneumatic motors, electric motors or the like.

Welding steel strap is also known, but is currently only done using spot weld and inert-gas (i.e., TIG) welding processes. During production, steel strap is spot welded, butt welded or inter-gas welded to join feed coils together to maintain a continuous manufacturing process.

Typically, steel strap has a coating to prevent rust or corrosion from accumulating on the strap. In order to effectively weld the strap to itself using spot welding techniques, the coating must first be removed so that the bare metal is welded together. Material preparation and welding can be a time consuming and labor intensive effort. Nevertheless, painted strap is still spot welded, however, joint strength cannot be consistently maintained.

Accordingly, there is a need for an automated steel strap welding machine. Desirably, such a machine can apply, tension and seal steel strap material around a load. More desirably, such a machine can be used with steel strap having a coating thereon, without the use of a crimp-type seal, and without removal of the coating. More desirably still, such a machine includes modular components to allow for quick replacement of components to minimize machine down time.

SUMMARY

A modular strapping machine feeds steel strapping material around a load, tensions the strapping material and welds the strapping material to itself in an end-to-end weld. The strapping machine includes a frame, a feed head removably mounted to the frame, a tension head removably mounted to the frame, a sealing head removably mounted to the frame and a strap chute.

A leading end of the steel strapping material is conveyed from the feed head, through the tension head and the sealing head, through the strap chute and back to the sealing head. The sealing head is configured to grip the leading end, grip and sever a trailing end of the strapping material and weld the leading end to the trailing end in an end-to-end weld. The strapping machine includes a controller to control overall operation of the machine.

The sealing head includes a body, a drive, an end grip disposed at about an inlet to the body, a cutter, a grip clamp and a loop grip disposed downstream of the end grip. The loop grip is carried on a loop grip carriage that is movable in a direction along the strap path.

A leading end of strapping material is secured by the end grip. After tensioning, a loop portion of the strap (formed by the trailing end) is gripped by the loop grip and severed by the cutter to form a loop end of the strapping material. The loop end is secured by the grip clamp and the loop grip carriage moves the loop end toward the leading end as current is passed though the loop end and the leading end to weld the loop end and leading end to one another in an end-to-end weld.

The sealing head includes a cam shaft operably coupled to the drive. The end grip, cutter, grip clamp, loop grip and loop grip carriage are operably connected to the cam shaft. The cutter and the grip clamp are carried on a shuttle that is configured to move transverse to the strap path. A drive moves the shuttle transverse to the strap path.

The end grip includes a pair of end grip jaws moveable toward and away from the strap path to grip and release the strap and the loop grip includes a pair of loop grip jaws movable toward and away from the strap path to grip and release the strap.

Weld electrodes are carried on the loop grip carriage and the grip clamp. A grip clamp anvil cooperates with the grip clamp.

To effect movement of the strapping material loop end toward the leading end, first and second wedge elements, operably connected to the cam shaft and the loop grip carriage cooperate with one another to move the loop grip carriage.

The sealing head welds first and second ends (e.g., the leading and loop ends) of the strapping material to one another in an end-to-end weld as the strap is under tension.

The sealing head includes a drive having a cam shaft operably connected thereto. The cam shaft is configured for cooperation with the grip clamp anvil, loop grip and loop grip carriage to grip and release the first and second ends, respectively.

First and second wedge elements are operably connected to the cam shaft and loop grip carriage, respectively. The first and second wedge elements cooperate with one another to move the strapping material loop end toward the leading end during welding.

Quick disconnect connections extend between a weld transformer and the loop grip weld electrode and between the weld transformer and the grip clamp weld electrode.

These and other features and advantages of the present invention will be apparent from the following detailed description, in conjunction with the appended claims.

BRIEF DESCRIPTION OF THE DRAWINGS

FIG. 4 is a perspective view of a tension head or tension module;

FIG. 5 is front view of the tension head;

FIG. 10 is a schematic illustration of the tension head operating in the tension cycle;

FIG. 11 is a schematic illustration of the tension head showing how the tension head opens to allow strap to feed through;

FIG. 14 is a perspective view of the feed head, sealing head and tension head as mounted to the machine;

FIG. 15 is a perspective view of the feed limit assembly;

FIG. 16 is a partial sectional view of the feed limit assembly;

FIG. 18 is a partial sectional view of the sealing head showing the end grip;

FIGS. 19a and 19b are partial sectional views showing the grip clamp/cutter shuttle;

FIGS. 20a-20e are various views of the grip clamp/cutter shuttle;

FIG. 27 is a side sectional view of the loop grip carriage showing the inclined wedge;

FIG. 28 illustrates the loop grip and spacer jaws;

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
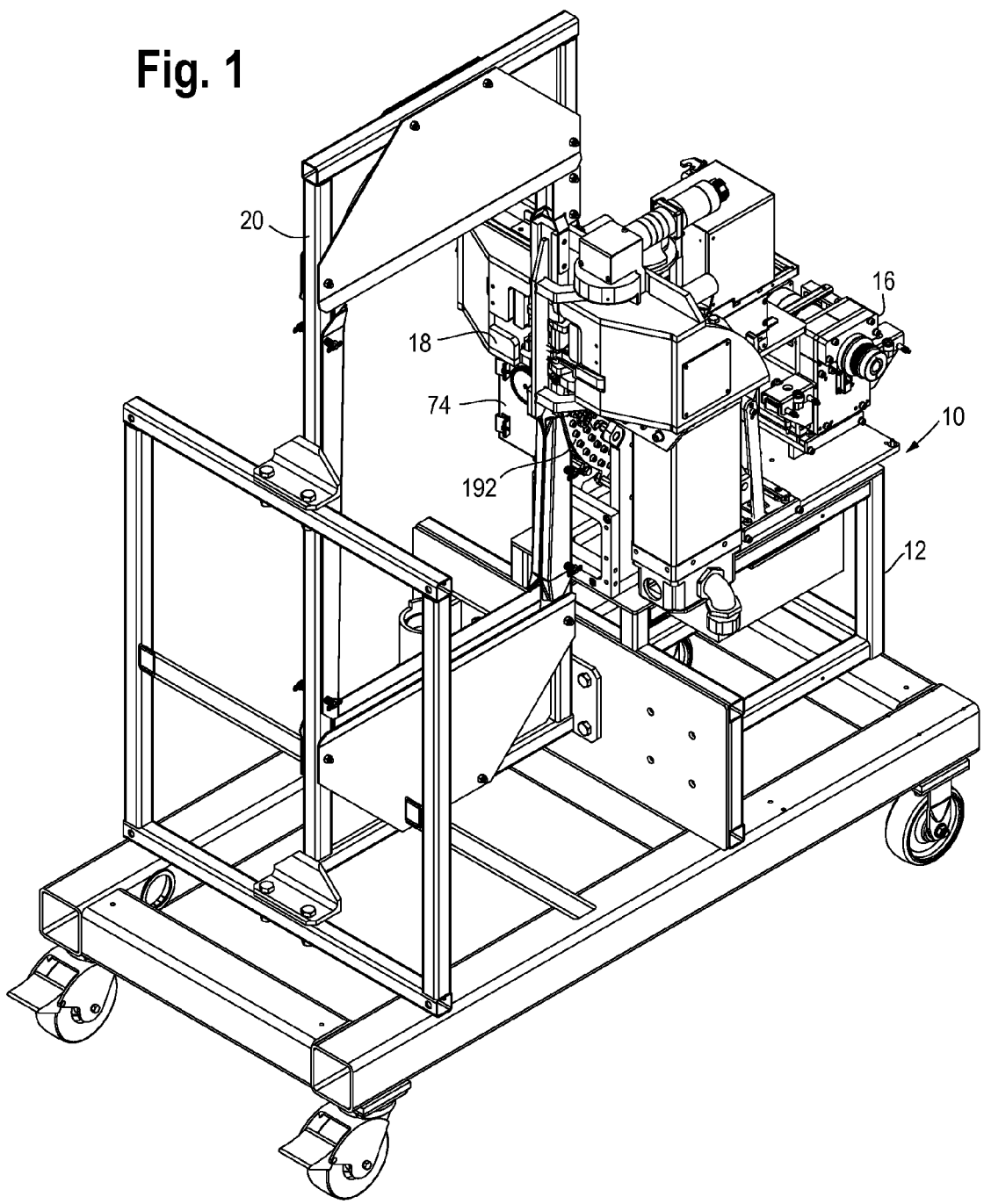
FIG. 1 is a perspective view illustrating the general layout of an exemplary modular strapping machine for steel strap.

Referring to the figures and in particular to FIG. 1 there is shown an exemplary strapping machine 10. The strapping machine 10 is configured for use with steel strap S that can be tensioned and welded to itself to form a loop of strap around a load. The strapping machine 10 includes, generally, a frame 12, a feed head 14, a tension head 16, a strap straightener 17, a sealing or welding head 18 and a strap chute 20 through which the strap S is conveyed around the load. Strap S is fed from a strap supply such as a strap dispenser (not shown). Operation of the strapping machine 10 is controlled by a controller 22.

Briefly, in a typical operation, strap S is pulled from the dispenser and fed into the machine 10 by the feed head 14. The feed head 14 conveys the strap S through the tension head 16, through the strap straightener 17 and the sealing head 18, into and around the strap chute 20 and back to the sealing head 18 in a forward direction. The feed head 14 then operates in reverse to withdraw the strap S from the strap chute 20 onto the load.

Figure 2:
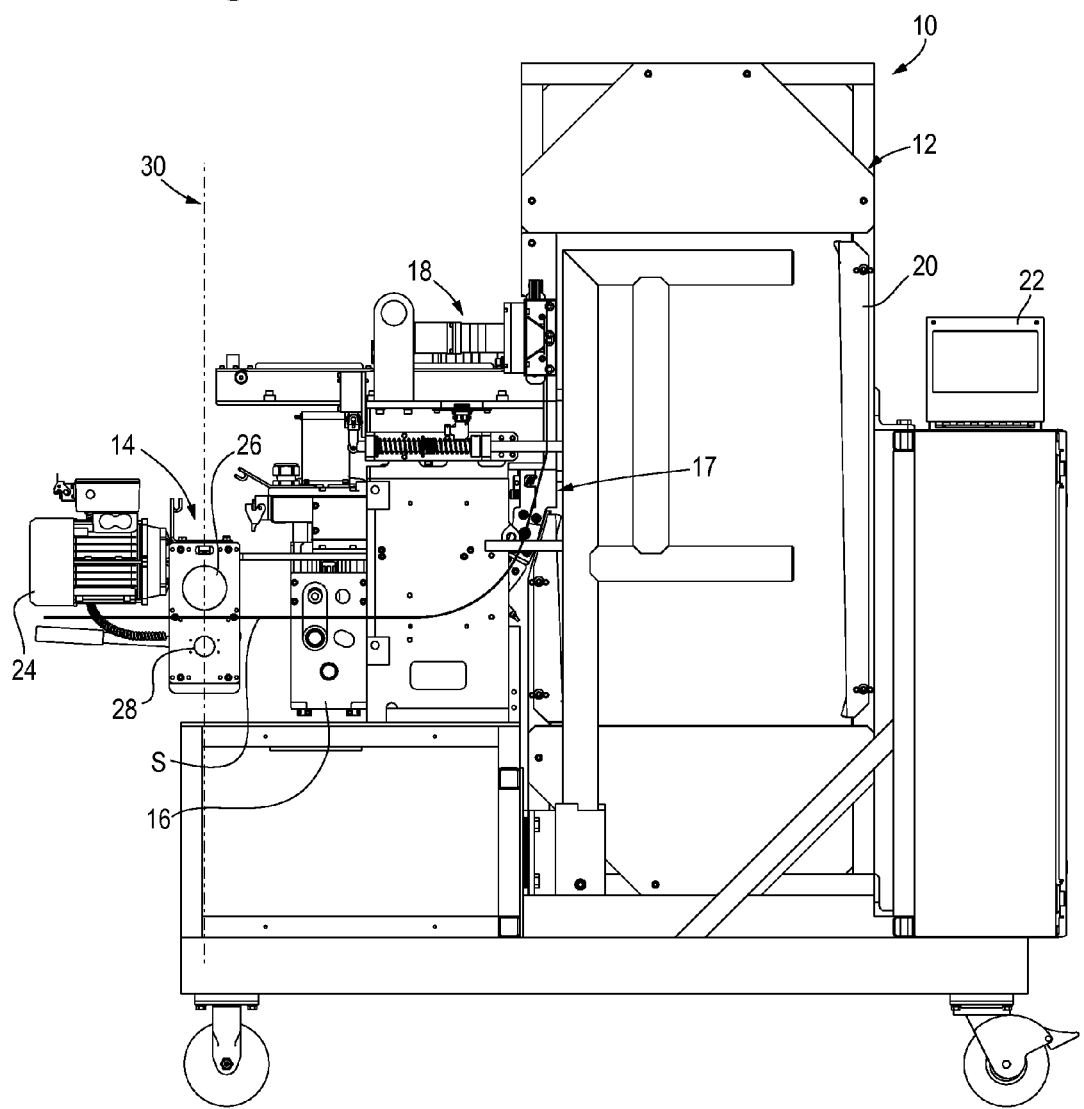
FIG. 2 is a front view of the strapping machine.
Figure 3:
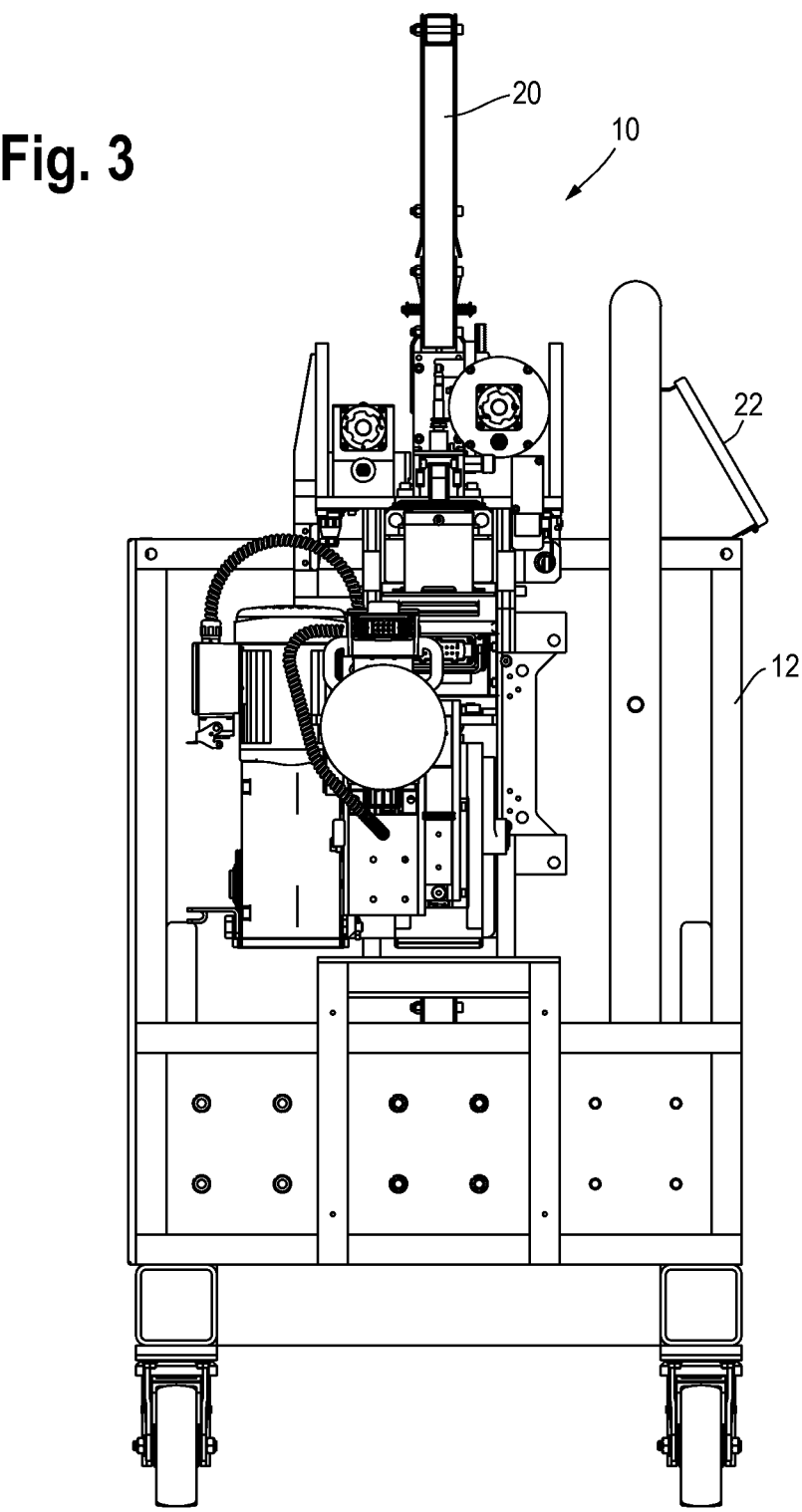
FIG. 3 is a side view of the machine.
Figure 7:
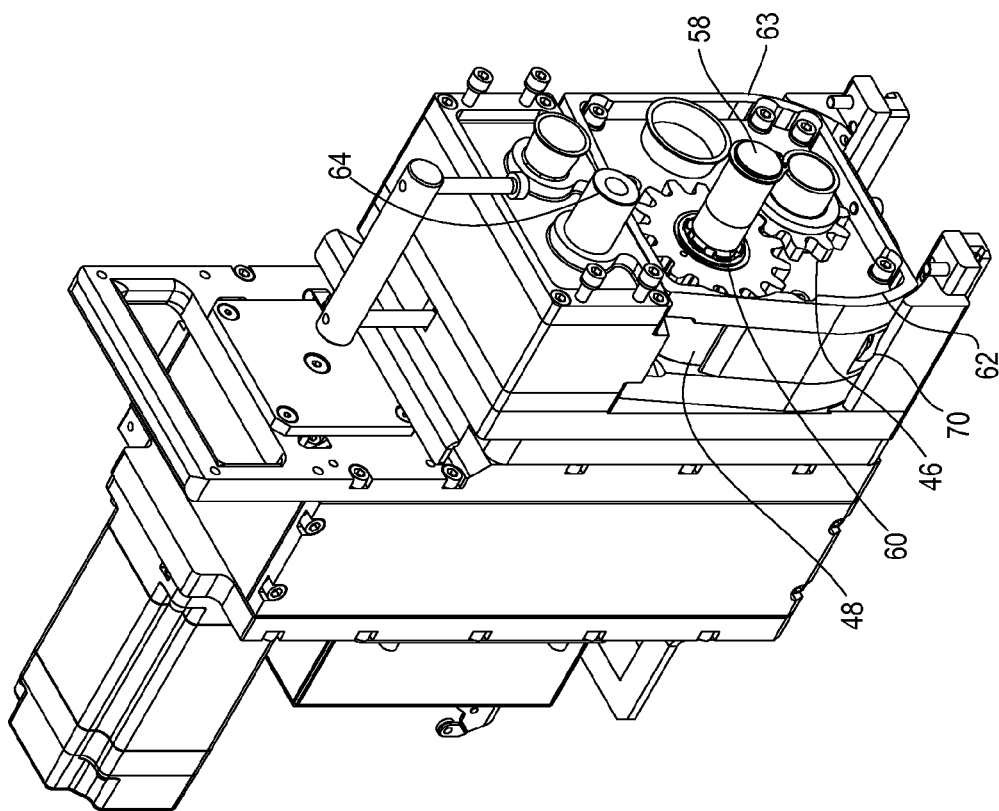
FIG. 7 is front view of the tension head with the cover plate removed for clarity of illustration.
Figure 6:
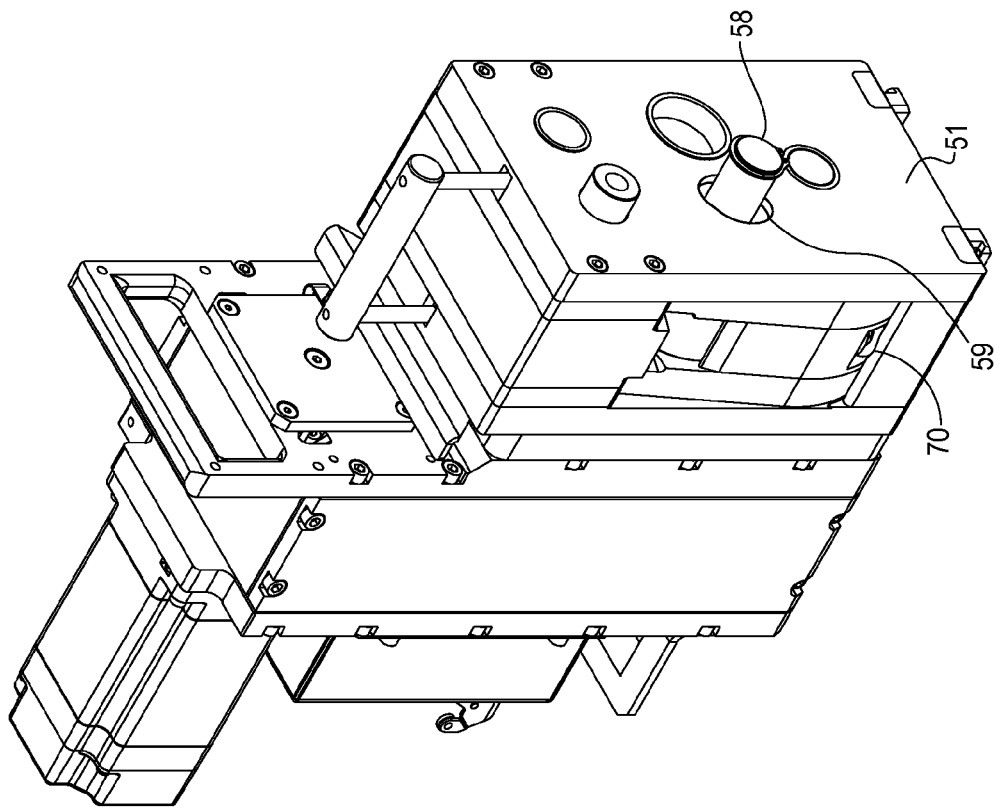
FIG. 6 is partial perspective view of the tension head with the tension head assembly to pinch wheel link removed for clarity of illustration.
Figure 9:
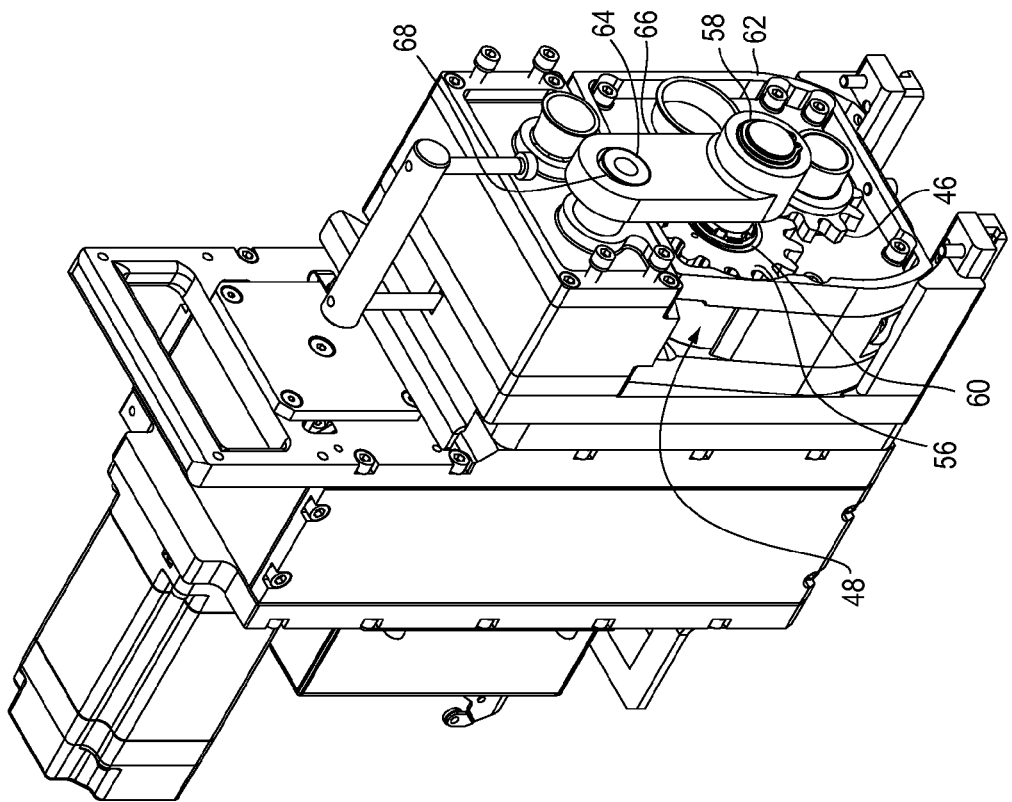
FIG. 9 is a perspective view illustrating the drive wheel to tension wheel assembly link (plate) mounted to the tension wheel.
Figure 8:
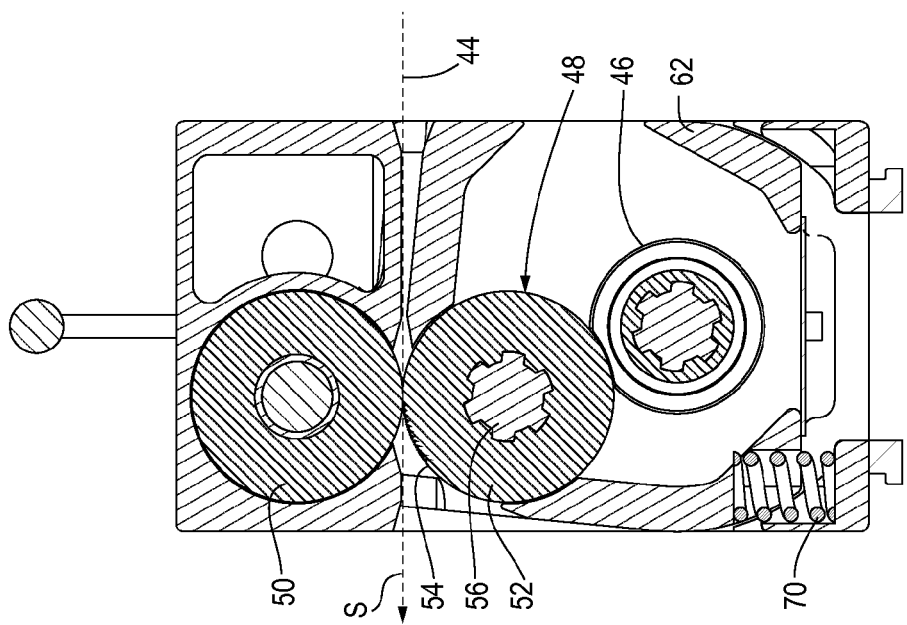
FIG. 8 is a front schematic illustration similar to FIG. 5 but with the cover and link plate removed for clarity of illustration.

The tension head 16 is configured to draw tension in the strap S as it is positioned around the load and to hold tension in the strap S at the commencement of the sealing cycle. As will be discussed below, and as seen in FIGS. 1 and 2, the strap S travels in a curved or arcuate path between the tension head 16 and the sealing head 18. As a result, during the tensioning cycle, and end-to-end curl can be induced in the strap S. The strap straightener 17 is configured to counteract this curl and to straighten the strap S to facilitate conveyance of the strap S through the sealing head 18 and strap chute 20.

With the strap S drawn in tension around the load, the sealing head 18 functions to cut the section of strap S from the supply, pull the strap ends toward one another, and weld the strap ends, end to end, to one another to form the strap loop. The load can then be discharged from the machine 10 and a subsequent load prepared for strapping.

It will be appreciated by those skilled in the art that the strap ends are welded in an end-to-end manner. As such, the strap ends (which are cut), do not have any of the typical coating materials on their surfaces. Accordingly, unlike know strap welding techniques, there is no need to prepare or otherwise treat the strap end surfaces prior to welding.

The feed head 14 includes a drive 24, a driven wheel 26 and an idler or pinch wheel 28. As noted above, the feed head 14 operates in the forward direction to feed strap S into the machine 10 and in the reverse direction to pull the strap S from the chute 20, onto the load and to consequently take up any slack strap S.

The illustrated feed head 14 is located remotely from the tension head 16 and the sealing head 18. This configuration allows the feed head 14 to be located outside of any enclosure 30 typically used for the tension 16 and/or sealing 18 heads and to be located on or near the frame 12 that carries the machine 10 components. It also allows the feed head 14 to be located at an elevation (e.g., near ground level) that permits ready access to the head 14 for maintenance, repair and the like.

Referring to FIGS. 4-9, the tension head 16 is of a self-actuating type and includes an electrical section 32 and a separate (mechanical) tension section 34. The electrical section 32 includes a drive 36, such as the illustrated electric motor, sensors 38 and the like. The only mechanical element is an output shaft 40 to connect to the tension section 34. The electrical and tension sections 32 and 34 are connected using a spring loaded latch 42 or like fastening system. This mounting or connection arrangement permits readily separating the electrical and tension sections 32 and 34 for ease of maintenance, repair and the like.

The tension section 34 includes a strap path (indicated generally at 44) through which the strap S traverses. The tension section 34 includes a drive wheel 46, a tension wheel assembly 48 and a pinch wheel 50. A cover plate 51 encloses the tension section 34. The drive wheel 46 is operably connected to the drive 36 by, for example, the motor output shaft 40. In a present embodiment, the drive wheel 46 is a drive gear and rotates in the clockwise direction to draw tension in the strap (see, e.g., FIG. 10). The tension wheel assembly 48 includes a tension wheel 52 that, in the present embodiment, has a friction surface 54. The friction surface 54 can be a roughened surface, for example, a diamond patterned surface to ensure a high friction force is created during the tension cycle.

The tension wheel assembly 48 includes a gear 56 that mates with the drive gear 46 to transfer power from the drive 36 to the tension wheel assembly 48. The tension wheel 52 and gear 56 are fixedly mounted to one another and can be mounted to a common shaft 58. In this manner, power is transferred from the drive 36 to the tension wheel 52. The tension wheel 52 and gear 56 are mounted on the shaft 58 by a one-way clutch 60 that, as is described below, permits rotation of the tension wheel 52 in the tension direction (counter-clockwise), but prevents rotation in the opposite direction.

The drive gear 46 and tension wheel assembly 48 are mounted to one another by a first link 62, that can be formed as a plate or carriage, as illustrated at 63. The first link 62 defines a first pivot arm $A_{62}$ that extends from the drive gear 46 axis though the tension wheel assembly 48 axis.

The pinch wheel 50 is mounted to a shaft 64 and is disposed about opposite the drive gear 46 for contact with the tension wheel 52. During the tensioning cycle, strap S is captured between the tension wheel 52 and the pinch wheel 50 and provides a surface against which the strap S is engaged to tension the strap S.

The tension wheel assembly shaft 58 and the pinch wheel shaft 64 are mounted to one another by a second link 66. The second link 66 has a slotted opening 68 where it receives the pinch wheel shaft 64 which allows the tension wheel 52 to move into and out of contact with the pinch wheel 50. The second link 66 defines a second pivot arm $A_{66}$ that is at an angle α, the energizing angle, to the first pivot arm $A_{62}$.

Both the drive wheel 46 (gear) and pinch wheel 50 are fixed transverse to their respective axes of rotation, but the tension wheel assembly 48 (the shaft 58) floats in the transverse direction. In this manner, as illustrated in FIGS. 10 and 11, the energizing angle α varies dependent upon the "float" of the tension wheel assembly 48. A spring 70 biases the tension wheel 52 into contact with the pinch wheel 50.

When operating in the tension cycle, as seen in FIG. 10, the drive 36 actuates, which rotates the drive gear 46 which, in turn, is meshed with the tension wheel assembly gear 56. As illustrated in FIG. 10, the drive 36 and drive gear 46 thus rotate in the clockwise direction which rotates the tension wheel 52 in the counter-clockwise direction. With the strap S positioned between the tension wheel 52 and pinch wheel 50, the strap S is drawn to the left, in tension, as illustrated by the arrow at 72.

With the tension wheel 52 capturing the strap S (between the tension wheel 52 and pinch wheel 50), the tension wheel 52 rotates in the counter-clockwise direction, but the tension wheel to drive wheel link (the first link 62) will tend to pivot in the clockwise direction, and thus the tension wheel 52 will attempt to creep up on the pinch wheel 50. This is due to the floating mount of the tension wheel assembly 48, the pivoting mount of the first link 62 and the slotted opening in the tension wheel assembly to pinch wheel link (the second link 66). As the first link 62 pivots in the clockwise direction, the energizing angle α decreases, which increases the normal force of (and the pressure exerted by) the tension wheel 52 on the pinch wheel 50, thus increasing the grip on the captured strap S.

Figure 12:
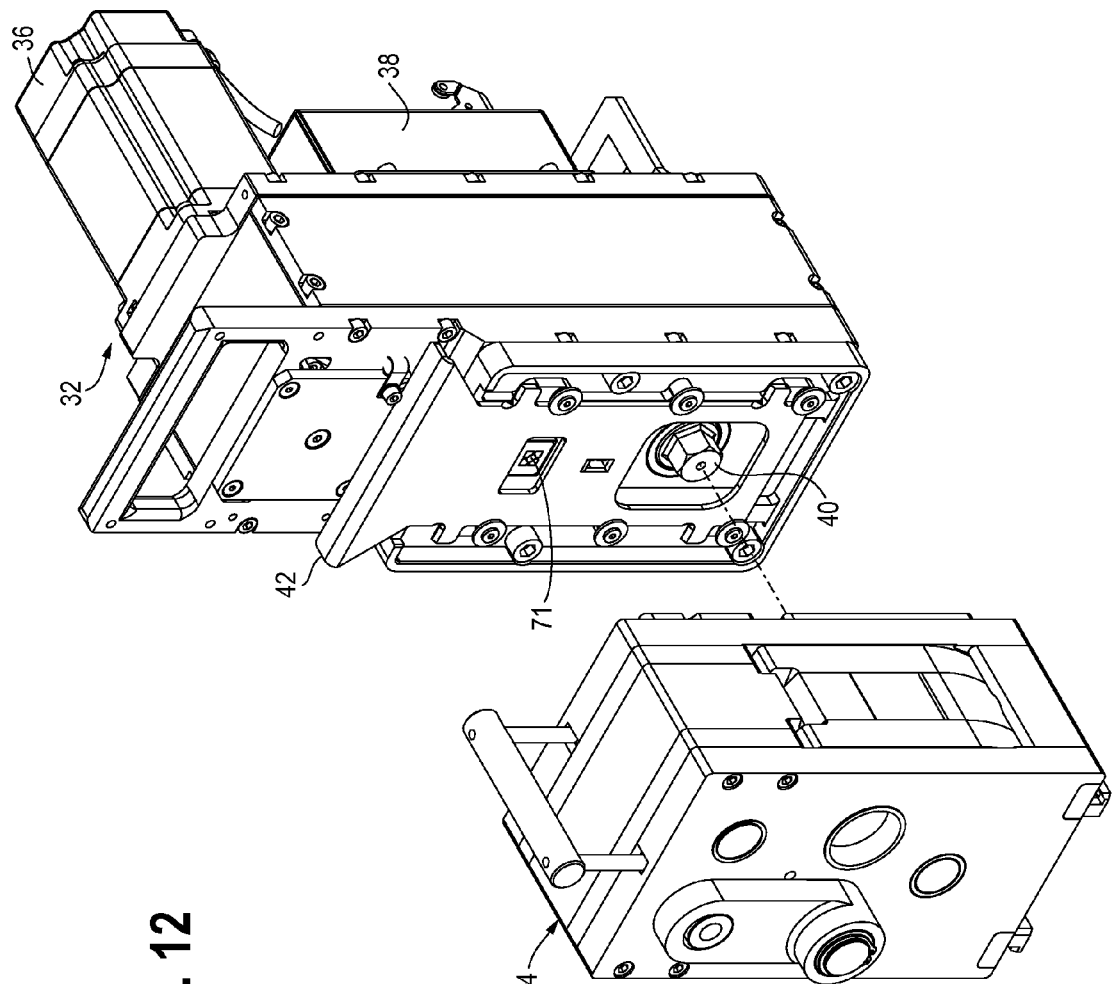
FIG. 12 shows the tension head and drive assembly separated from one another.

As seen in FIG. 11, when operating in the feed direction, as the drive 36 and drive gear 46 rotate in the counter-clockwise direction, the one-way clutch 60 mounting the tension wheel assembly 48 to the shaft 58 prevents rotation of the tension wheel 52. The force exerted by the drive gear 46 acts to pivot the second link 66 in the counter-clockwise direction, overcoming the spring 70 force (that biases the tension wheel 52 into contact with the pinch wheel 50). Because of the slot 68 in the tension wheel to pinch wheel link (the first link 62), the tension wheel 52 moves or pivots out of contact with pinch wheel 50 and opens a gap or space (indicated generally at 74) for the strap S to move freely in the forward direction in the feed cycle between the pinch and tension wheels 50 and 52. A proximity sensor 71 located in the tension head 16 (see FIG. 12) senses when the tension wheel 52 (as mounted to the first link 62) is pivoted away from the pinch wheel 50 and stops the drive 36 from continuing to drive the drive gear 46. The link 62 (and tension wheel 52) are maintained in position during the feed cycle.

Figure 12A:
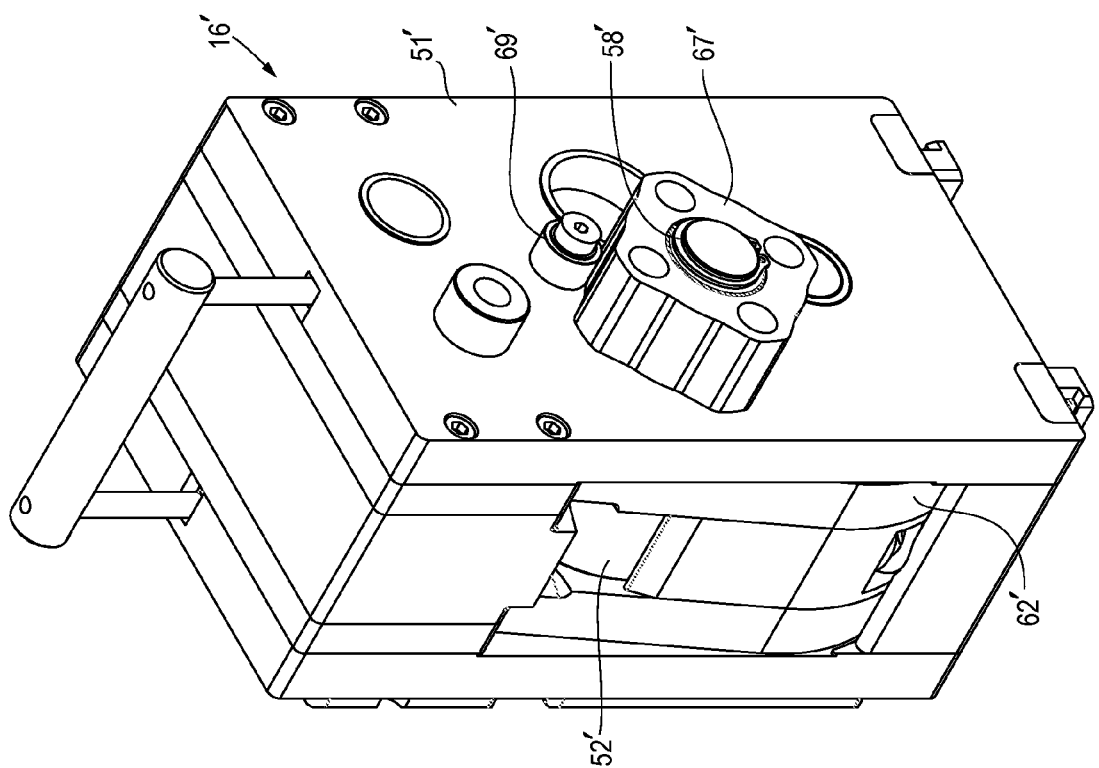
FIG. 12A is a front (perspective) view of an alternate tension head.
Figure 13:
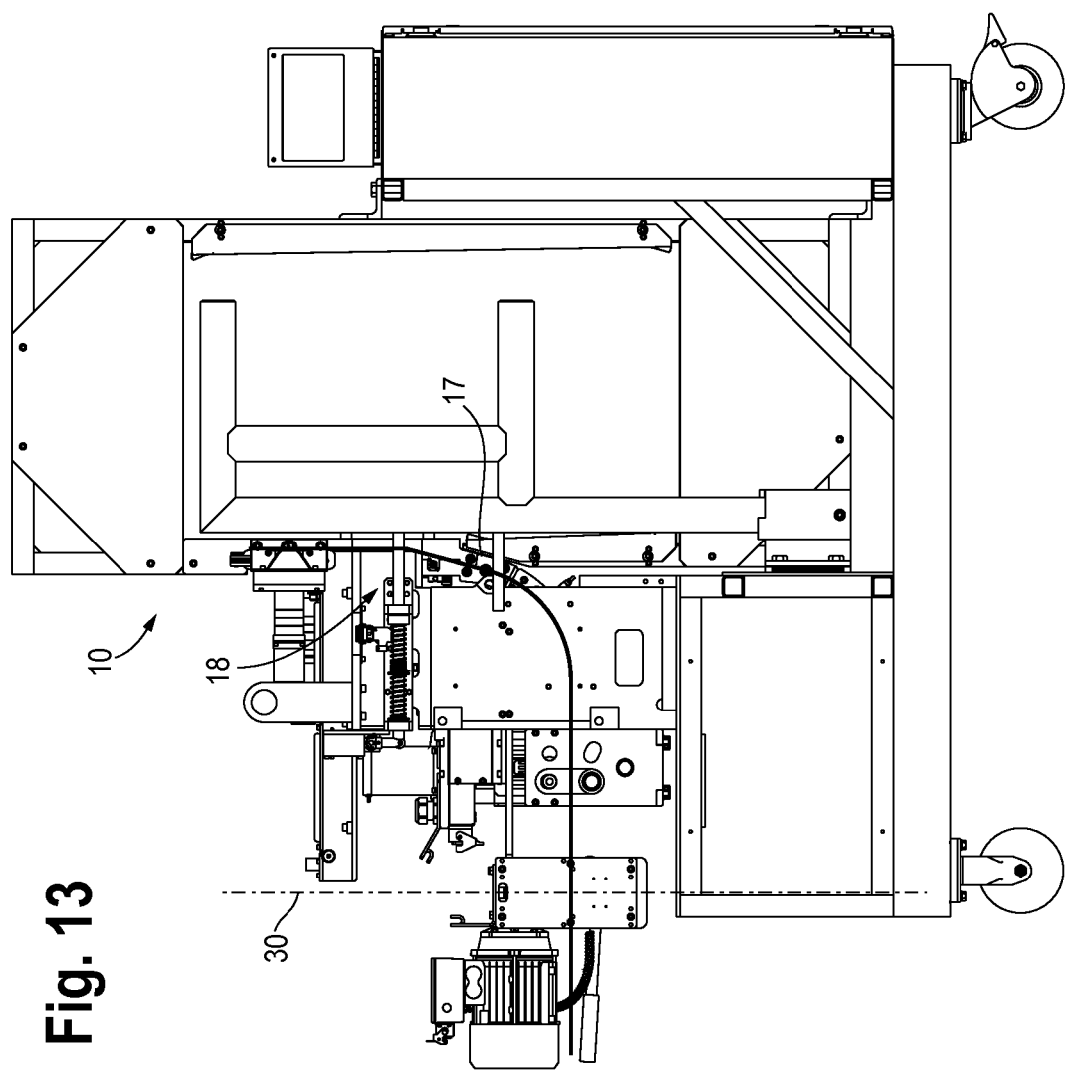
FIG. 13 is a front view of the machine, showing the feed head, tension head and sealing head.
Figure 17:
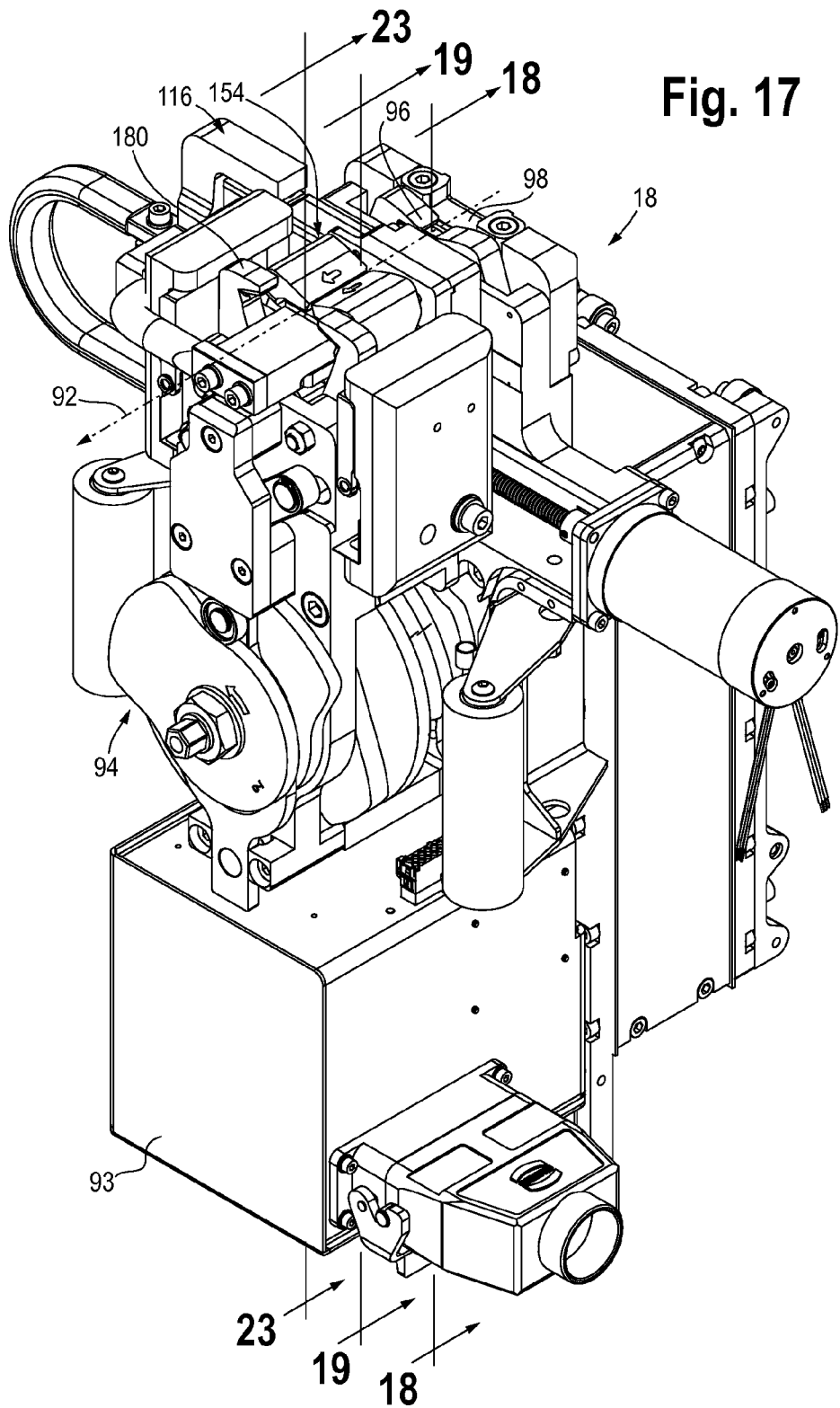
FIG. 17 is a perspective view of the sealing head.
Figure 20C:
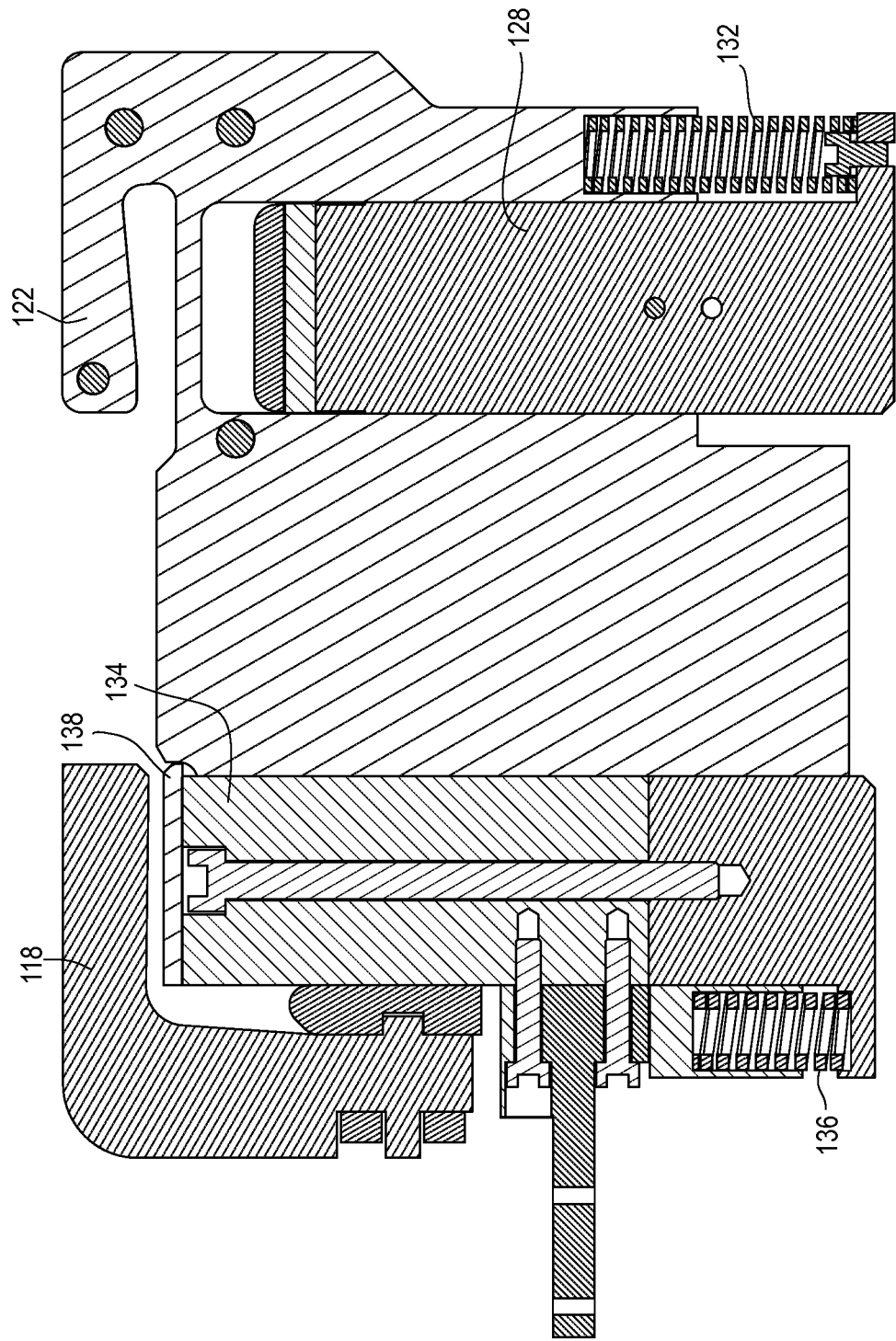
Figure 20E:
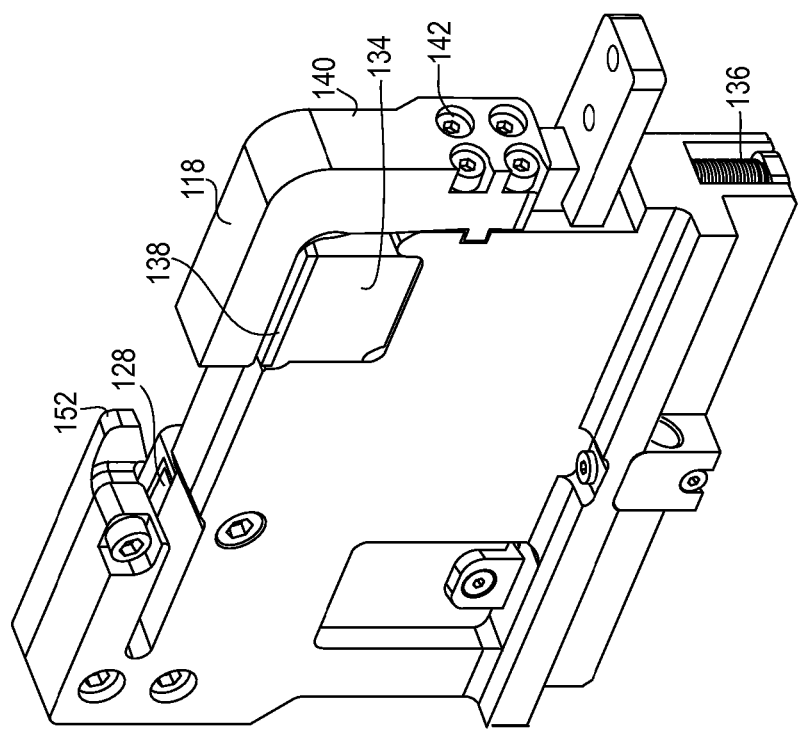
Figure 20D:
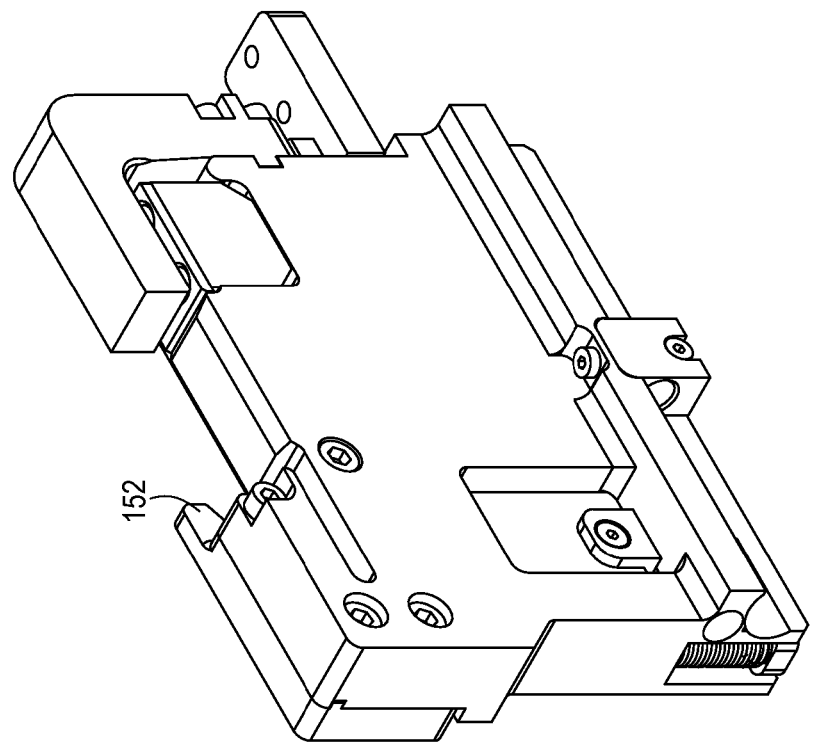
Figure 21:
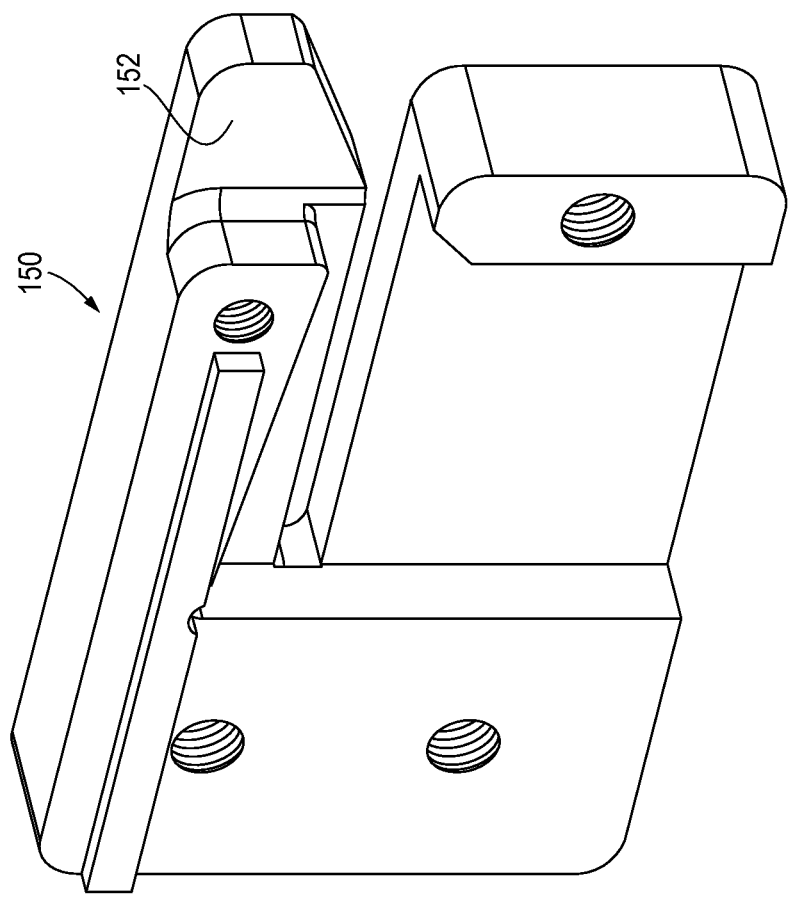
FIG. 21 is a perspective view of the stationary portion of the cutter anvil.

An alternate embodiment of the tension head 16' is illustrated in FIG. 12A. In this embodiment, the internal and drive elements of the tension head 16' are the same as those of the embodiment of the tension head 16 illustrated in FIGS. 6-12. However, rather than a linkage 66, in the alternate embodiment 16', a cam 67' is mounted to the shaft 58' and a cam follower 69' is mounted to the cover plate 51' to facilitate pivoting movement of the tension wheel 52' and first linkage 62'.

Referring to FIGS. 2 and 35-38, the strap straightener 17 is positioned between the tension head 16 and the sealing head 18. The strap straightener 17 is configured to straighten the strap S to counteract any end-to-end curl that may be induced in the strap as a result of, for example, the tensioning cycle. As can be seen from FIGS. 1 and 2, the path between the tension head 16 and the sealing head 18 is curved, reorienting the strap from a horizontal path from the feed head 14 to a vertical path at the sealing head 18 and strap chute 20. As a result, during the tension cycle, an end-to-end curl is induced in the strap due to the curved path and the tension drawn on the strap S. This end-to-end curl can result in misfed strap and strap jams.

The strap straightener 17 is provided to counteract the end-to-end curl by bending the strap S in a direction opposite of the induced end-to-end curl. The strap straightener 17 includes a body 194, an inlet guide element 196, an outlet guide element 198 and a movable straightening element 200. In a present configuration, the inlet guide element 196 includes a pair of spaced apart rollers 202a and 202b, and likewise, the outlet guide element 198 includes a pair of spaced apart rollers 204a and 204b. The rollers 202a,b and 204a,b of each element 196, 198 are at a fixed distance from one another and are fixed relative to the body 194. The roller axes $A_{202}$ and $A_{204}$ are fixed, such that a plane $P_{202}$ and $P_{204}$ through each axis pair $A_{202}$ and $A_{204}$ is fixed, and the planes $P_{202}$ and $P_{204}$ are fixed relative to one another.

The movable straightening element 200 also includes a pair of rollers 206a and 206b. The rollers 206a and 206b are mounted to a carriage 208 that is movable relative to the inlet and outlet guide elements 196, 198. In a present configuration, the carriage 208 is pivotable relative to the inlet and outlet guide elements 196, 198, as indicated by the double headed arrow at 210. In this manner, a plane $P_{206}$ through the axes pair $A_{206}$ of the movable element rollers 206a and 206b is movable relative to the fixed element roller planes $P_{202}$ and $P_{204}$.

To effect movement or pivoting of the carriage 208, the carriage 208 includes a stub shaft 212 extending therefrom. A pivot link 214 is mounted to the stub shaft 212, such that rotating or pivoting the pivot link 214 pivots the carriage 208 and thus the moveable straightening element 200. The pivot link 214 can include teeth 216, which can be meshed with a drive gear 218 to move the pivot link 214. The drive gear 218 can be driven by a drive, or manually driven. A fastener 220, such as the illustrated shoulder bolt can be used to secure the moveable element 200 into a desired position.

As illustrated in FIGS. 13-16, a feed limit assembly 74 is located in the strap path, at about the end of the strap chute 20 to receive the leading end of the strap S as the leading end is conveyed into the sealing head 18. The feed limit assembly 74 can be positioned adjacent to the strap straightener 17. The feed limit assembly 74 includes a drive 76, a drive wheel 78, a biased carriage 80 and roller 82, and a sensor 84. In a present embodiment, the drive wheel 78 has a notched or V-shaped edge or groove 86, and the roller 82 is positioned opposing the groove 86. The V-shaped groove 86 and roller 82 define a strap path, indicated generally at 88. The roller 82 is mounted to the biased carriage 80, which biases the roller 82 toward the wheel 78. Biasing of the carriage 80 can be, for example, by a spring 90. The strap path 88 has a predetermined width $w_{88}$ that, when the carriage 80 (and roller 82) are in a home position, is slightly less than a width of the strap S. Alternately, although not shown, the feed limit assembly can include a drive wheel with a one-way clutch bearing instead of a drive motor.

In a present embodiment, the sensor 84 is positioned adjacent to the carriage 80 so that the carriage 80 pivots into and out of contact (electro, electro-mechanical and/or mechanical contact) with the sensor 84. As strap S passes into the strap path 88, it rides in the groove 86 and contacts the roller 82 which, in turn, pivots the carriage 80 away from the sensor 84. In one embodiment, the sensor 84 is a proximity sensor.

As seen in FIGS. 35-38, the strap return sensor 84' can be positioned on the body 194 of the strap straightener 17. In this configuration, as the strap S returns toward the sealing head 18, the strap S contacts a limit flag 222 which is operably mounted to a sensor contact 224, that moves into contact with the sensor 84'. The limit flag 222 is biased into the strap path by a spring 226. This configuration of the strap sensor 84' and its components can be used in place of the pivoting carriage 80 of the embodiment of FIGS. 15-16.

As will be discussed in more detail below, the feed limit assembly 74 provides a number of functions. First, upon sensing that strap S has entered the strap path 88, the sensor 84 provides a signal to the controller 22 and/or feed head 14 to indicate that strap S is returning to the sealing head 18. Second, the feed limit assembly drive 76 and wheel 78 provide sufficient motive force on the strap S to assure that the leading end of the strap S is urged into the sealing head 18 and is properly positioned for sealing head 18 operation.

The sealing head 18 is illustrated in FIGS. 17-34. The sealing head 18 functions, in an overall sealing cycle, to receive the strap S as it passes through the head 18 and into the strap chute 20, receive the leading end of the strap S that returns from the chute 20, grasp or clamp both ends of the strap S, cut the strap from the supply to form a loop end of the strap, and weld the strap ends to one another in an end-to-end weld or seal. It will be understood from the present disclosure, and as discussed above, that the weld is an end-to-end weld, not an overlapping weld, that is carried out automatically and while the strap S is in tension around the load. To effect the end-to-end weld, as part of the sealing cycle, the sealing head 18 moves the two cut ends of the strap toward one another as the weld is carried out.

The sealing head 18 defines a strap path therethrough as indicated generally at 92. A number of assemblies are aligned along the strap path 92. A cam 94, located within the head 18, and driven by a cam drive 93, includes various lobes that cooperate with cam followers within the head 18 to move the assemblies through their respective cycles, as will be described below.

Referring to FIG. 18, an end grip 96 is at the inlet 98 to the sealing head 18. The end grip 96 includes a pair of jaws 100 that define an upper guide 102 of the strap path 92. The end grip jaws 100 move between an open position in which strap S is received by the jaws 100 and a closed position in which the jaws 100 cycle down and the leading end of the strap S is captured between the jaws 100 and an anvil 102. The anvil 102 is formed as part of a link 104 that moves with the end grip jaws 100 between the open and closed positions.

The end grip jaws 100 and anvil 102 (and anvil link 104) move between the open and closed positions by a dual-acting cam 106 having a pair of cam followers 108a and 108b. A first cam follower 108a on the link 104 moves the anvil 102 and end grip jaws into the closed position and a second cam follower 108b, on an opposite side of the link 104 move the anvil 102 and end grip jaws 100 into the open position.

The jaws 100 pivot about a pivot joint 110, such as the illustrated pivot pin. Link arms 112 extend from the anvil link 104 to the jaws 100 to pivot the jaws 100. As the anvil link 104 moves upwardly (following the cam follower 108a) to move the anvil 102 toward the strap path 92, the link arms 112 pivot the base of the end grip jaws 100 outwardly which in turn pivots a gripping portion 114 of the jaws 100 inwardly onto the strap S. Conversely, as the cam 94 continues to rotate and the opposing cam follower 108b contacts the link 104, it moves the anvil link 104 (and thus the anvil 102) downwardly and pivots the jaws 100 to open the end grip 96.

Figure 22B:
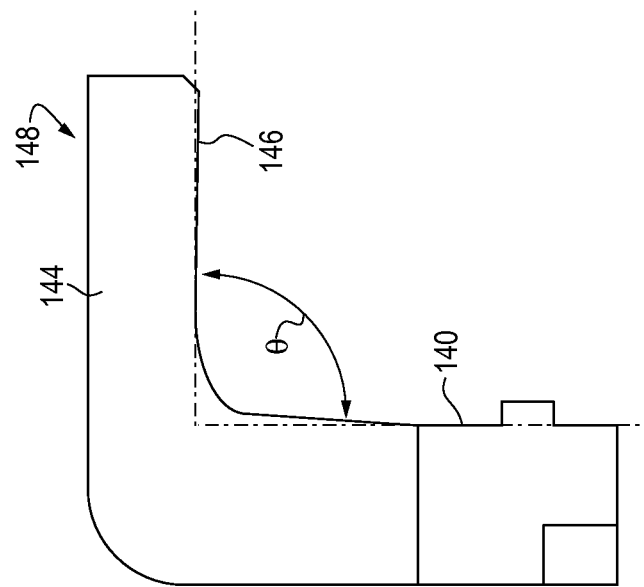
FIGS. 22a and 22b are perspective and side views of the grip clamp.
Figure 22A:
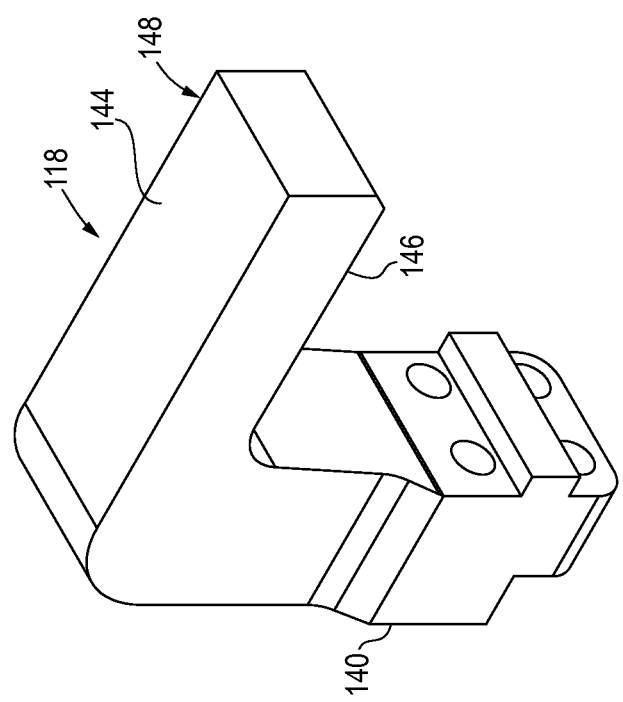
Figure 23:
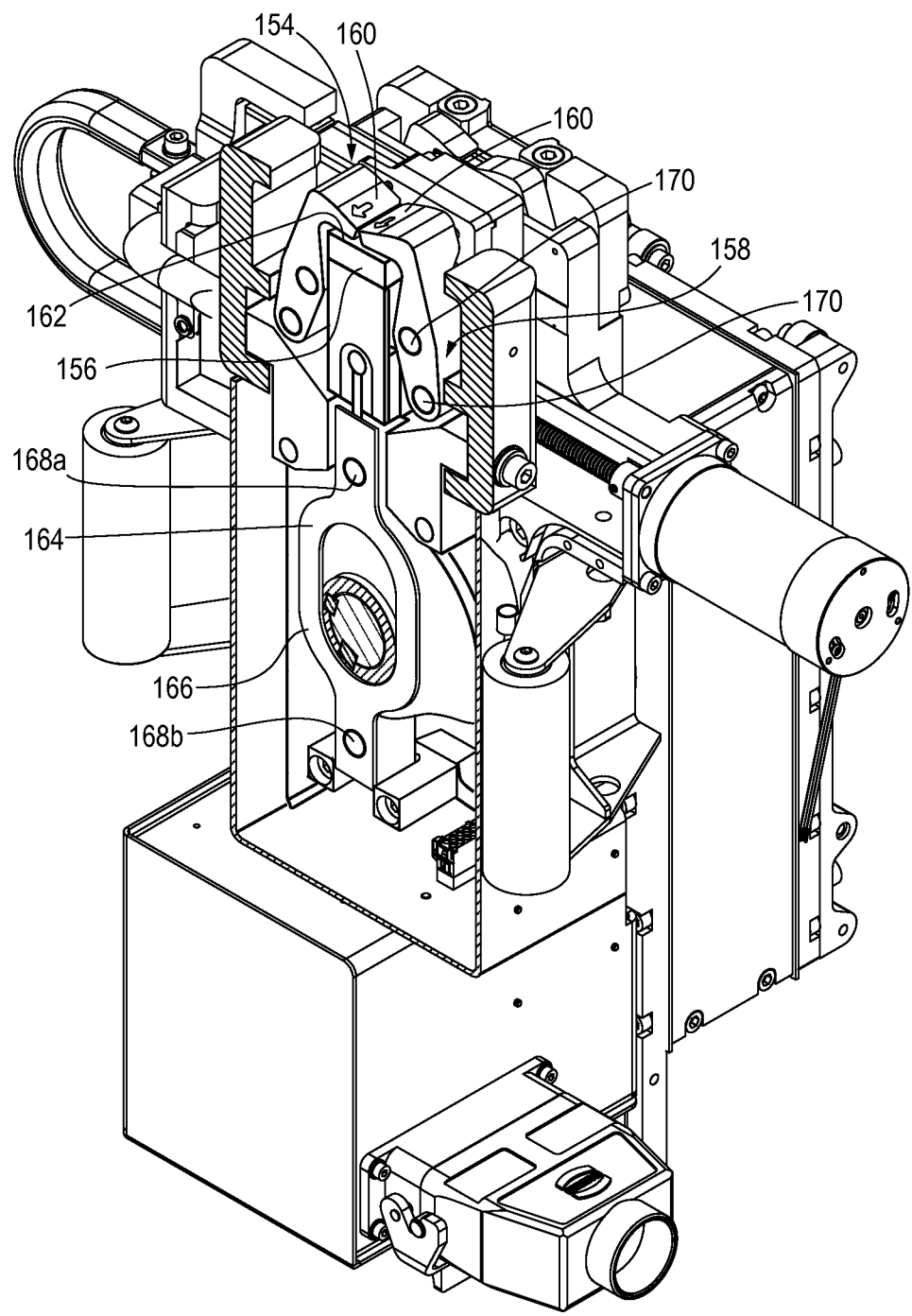
FIG. 23 is a sectional view showing the loop grip and loop grip carriage.

Adjacent to the end grip 96 is a grip clamp/cutter shuttle 116 that includes a grip clamp 118 and a cutter 120. The shuttle is illustrated generally in FIGS. 19-20, a cutter stationary portion or anvil 122 is illustrated in FIG. 2, and the grip clamp 118 is illustrated in FIGS. 22a and 22b. The shuttle 116 is movable transverse to the strap path 92 to move the cutter 120 into the strap path 92 to cut the strap S (from the supply to form the loop end) and to move the grip clamp 118 into place during the weld cycle. A present shuttle 116 has three transverse positions that lie on the strap path 92: the cutting position (FIG. 19a); the welding position (FIG. 19b); and a home or intermediate position between the cutting and welding positions. The shuttle 116 includes a drive 126, such as the illustrated screw drive, to carry out the transverse movement.

The cutter 120 includes the stationary cutter anvil 122 and a movable cutter blade 128 that moves between a home or retracted position and a cutting position in which the cutter blade 128 moves (upwardly) toward the anvil 122 to cut the strap S. The cutter blade 128 is driven by a cam follower 130 cooperating with the rotating cam 94 to move toward the strap path 92. The cutter blade 128 is returned to the home position by a biasing element, such as the illustrated springs 132 (see, FIG. 20c).

The grip clamp 118 is fixedly mounted to the shuttle 116 and a grip clamp anvil 134 moves between a home position and a clamping position, toward the grip clamp 118, to capture the strap S between the grip clamp 118 and the anvil 134 during the welding cycle. The anvil 134 is biasedly mounted within the shuttle 116 to a retracted position by a spring 136. The anvil 134 includes a conductor surface or electrode 138 thereon to conduct current during the welding cycle.

The grip clamp 118, which is best seen in FIGS. 22a and 22b, includes a base portion 140 that is mounted to the shuttle 116 by, for example, fasteners 142 (see, FIGS. 20d, 20e), and a cantilevered clamp portion 144 that extends over the strap path 92. The grip clamp 118 serves to secure the strap S against the anvil 134 during the welding cycle. As best seen in FIG. 22b, the grip clamp 118 is formed having a contact surface 146 that, when in a relaxed state, is slightly biased or angled (as indicted at θ) toward the anvil 134. It will be appreciated by those skilled in the art that a significant force must be exerted on the grip clamp 118 during the welding cycle to assure maximum contact between the strap S and the electrode 138. As such, it is desirable to position as much surface area of the grip clamp 118 as practical on the strap S. Given that such parts (and in particular cantilevered parts) will flex with increasing pressure applied to the cantilevered end 146, the end 146 is biased or slightly angled, at the free end 148, toward the electrode 138 (anvil 134). This assures that as the cantilevered end 148 flexes, the grip clamp 118 remains flat when in contact with the strap S.

An end stop 150 is formed as part of the shuttle 116. The end stop 150 moves transversely with the shuttle 116, and includes a stop surface 152 that the leading end of the strap S contacts as it returns to the sealing head 18 (subsequent to traversing through the strap chute 20).

A loop grip 154 is adjacent to the stop surface 152. The loop grip 154 serves to secure the strap end cut from the supply (the loop end of the strap), and, during the welding cycle, move the loop end toward the leading end of the strap and provide a conductor surface or electrode 156 for carrying out the strap weld. The loop grip 154 is carried on a carriage 158 and includes a pair of loop grip jaws 160 that also define an upper guide of the strap path 92. The loop grip jaws 160 move between an open position in which strap S moves through the sealing head 18 and a closed position in which the loop grip jaws 160 move into contact with, and capture the strap S against an anvil 162. The loop grip jaws 160 can be provided with teeth 161 to secure the strap S against the anvil 162. The loop grip anvil 162 is formed as part of the carriage 158 and includes the electrode 156 against which the strap S is secured for conduct of current during the welding cycle. The loop grip 154 includes a link 164 that moves with the loop grip jaws 160 between the open and closed positions.

The loop grip carriage 158, which includes the loop grip jaws 160 and anvil 162 (and the loop grip link 164) moves between the open and closed position by a dual-acting cam 166, having a pair of cam followers 168a and 168b. A first cam follower 168a on the loop grip link 164 moves the anvil 162 and loop grip jaws 160 into the closed position and a second cam follower 168b on an opposite side of the link 164 moves the anvil 162 and loop grip jaws 160 into the open position.

The loop grip jaws 160 pivot about a pivot joint, such as the illustrated pivot pin 170. Link arms 172 extend from the anvil link 164 to the jaws 160 to pivot the jaws 160. As the anvil link 164 moves upwardly (following the cam follower 168a) to move the anvil 162 toward the strap path 92, the link arms 172 pivot the base of the jaws 160 outwardly which in turn pivots the upper portion of the jaws 160 inwardly to secure the strap S against the anvil 162. Conversely, as the cam 166 continues to rotate and the opposing cam follower 168b contacts the link 164, it moves the anvil link 164 (and thus the anvil 162) downwardly and moves the link arms 172 to open loop grip jaws 160.

To carry out movement of the strap ends toward one another, the loop grip carriage 158 moves longitudinally along, that is in the direction of, the strap path 92. Accordingly, the carriage 158 includes an inclined or wedge surface 174 that cooperates with an actuating wedge element 176 actuated by the cam 94. As the actuating wedge 176 moves into contact with the carriage wedge 174, the carriage 158 is urged toward the end grip 96 to, as will be discussed in more detail below, move the loop end of the strap S toward the leading end for sealing. The actuating wedge 176 is also configured with a dual-acting cam 178 to provide positive, driven movement between the engaged and disengaged positions to positively drive the loop grip carriage 158 between the gripping and welding positions.

Figure 24:
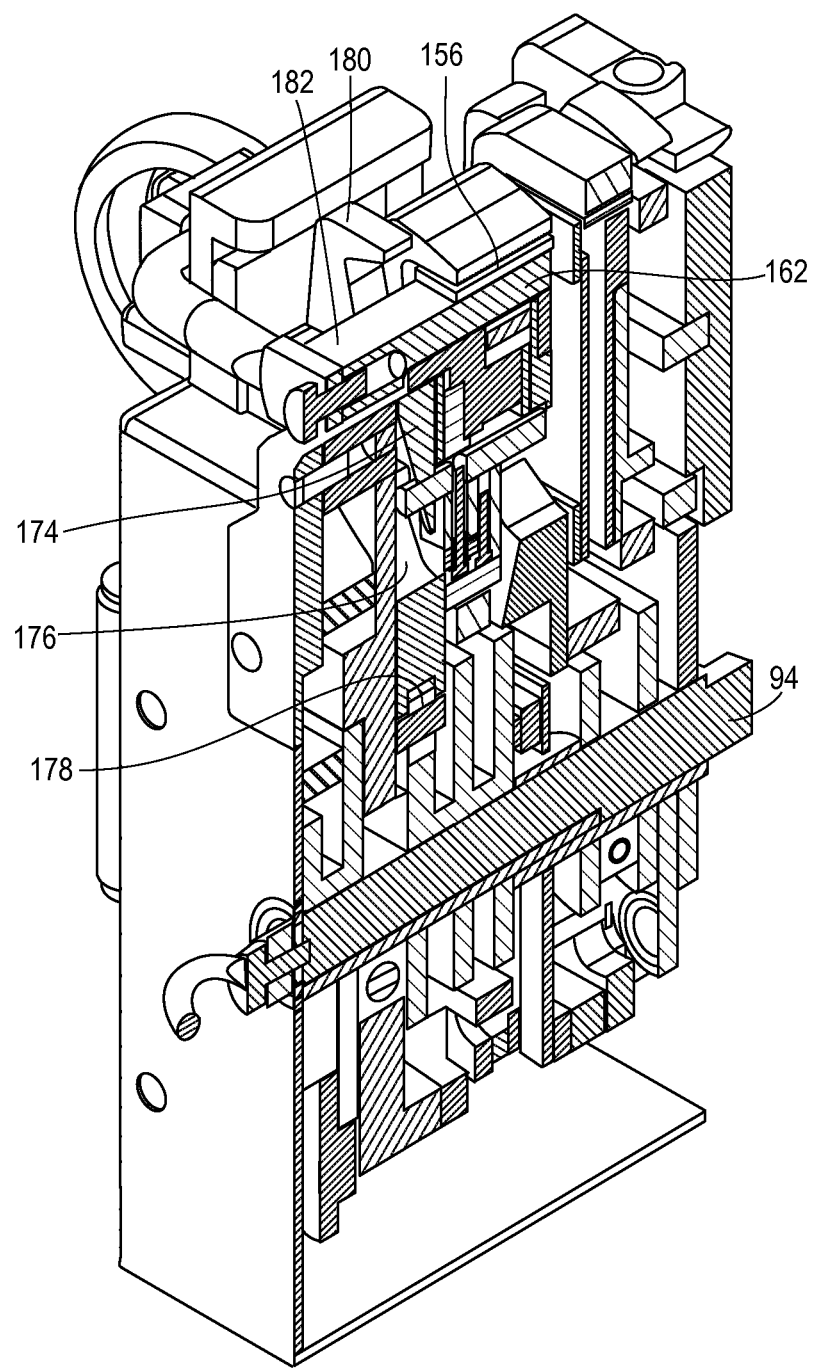
FIG. 24 is a sectional view through the sealing head, illustrating the cam drive for the head.
Figure 25C:
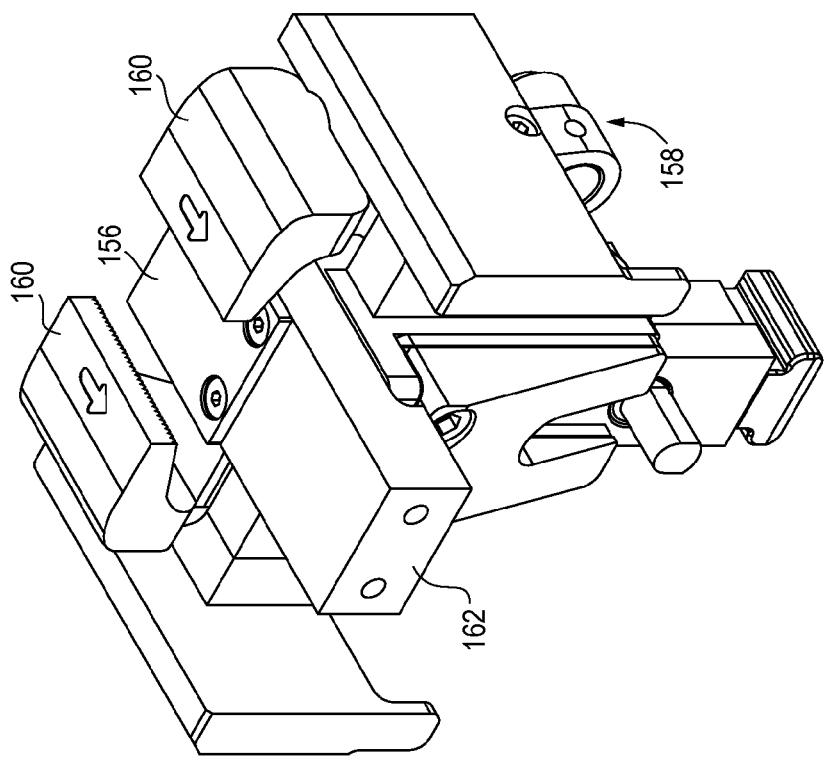
FIGS. 25a-25d are various illustrations of the loop grip and carriage.
Figure 25A:
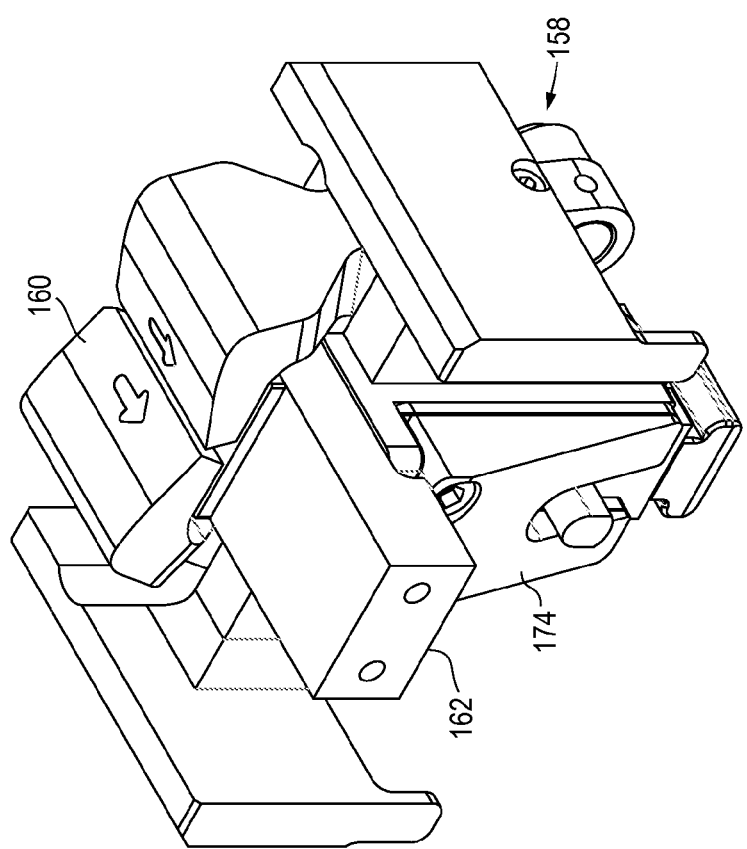
Figure 25D:
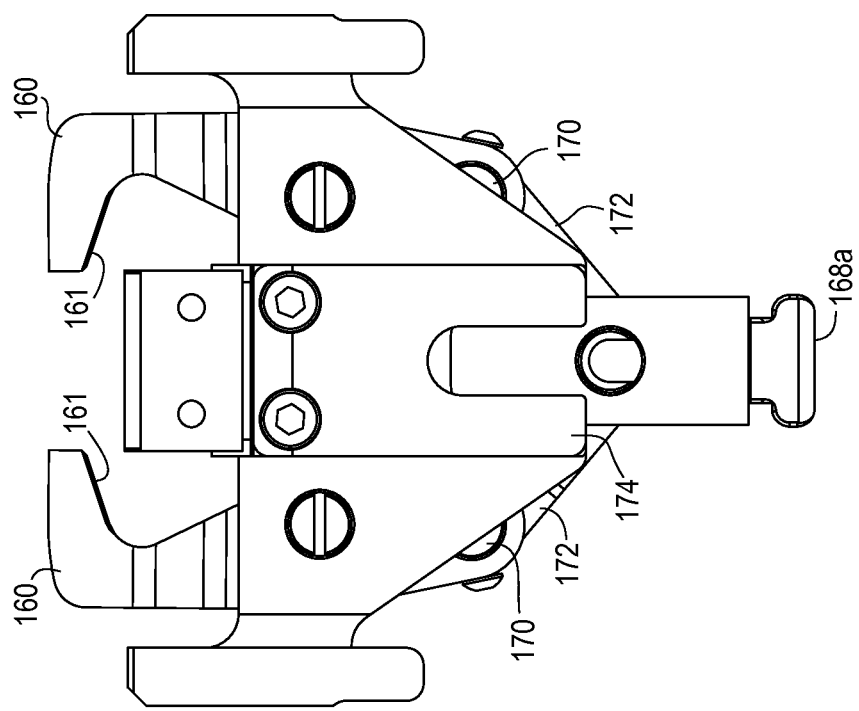
Figure 25B:
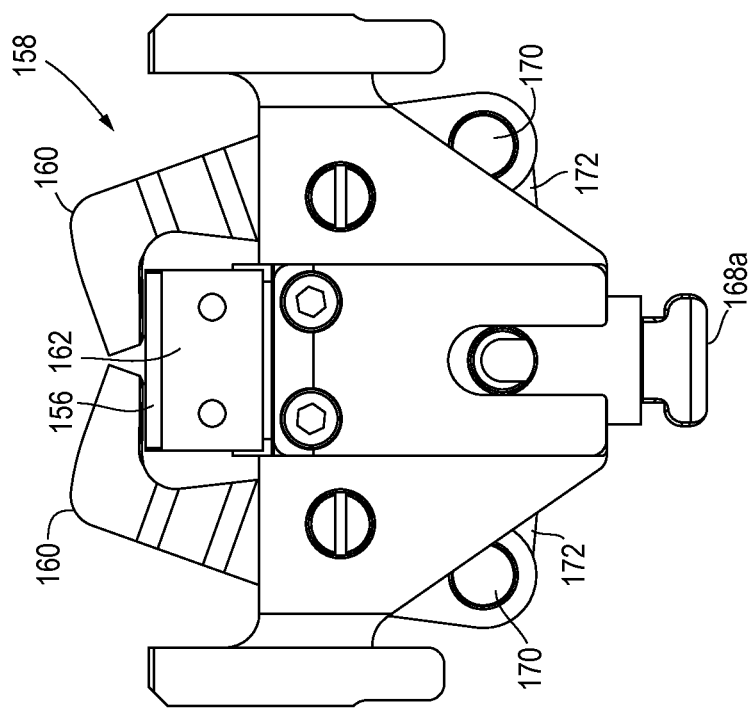
Figure 26B:
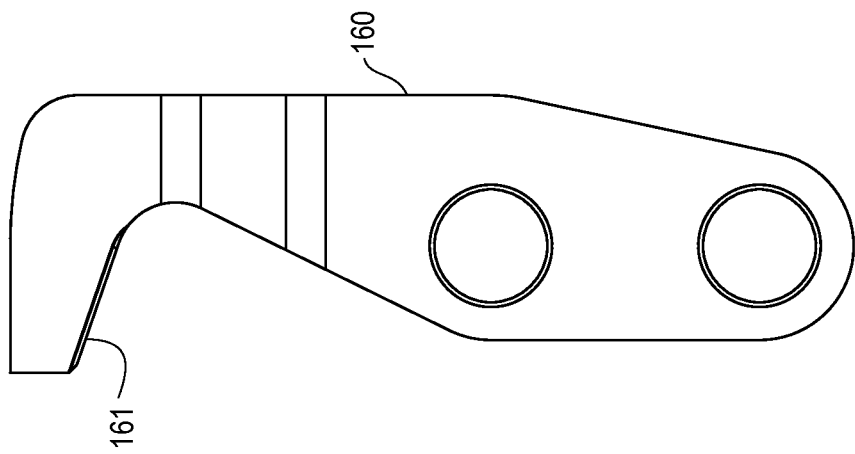
FIGS. 26a and 26b are perspective and side views of the loop grip jaws.
Figure 26A:
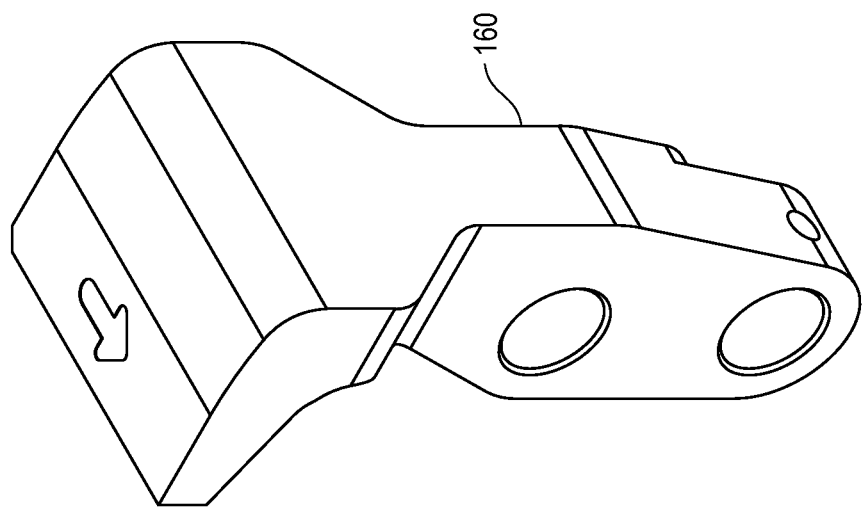
Figure 29:
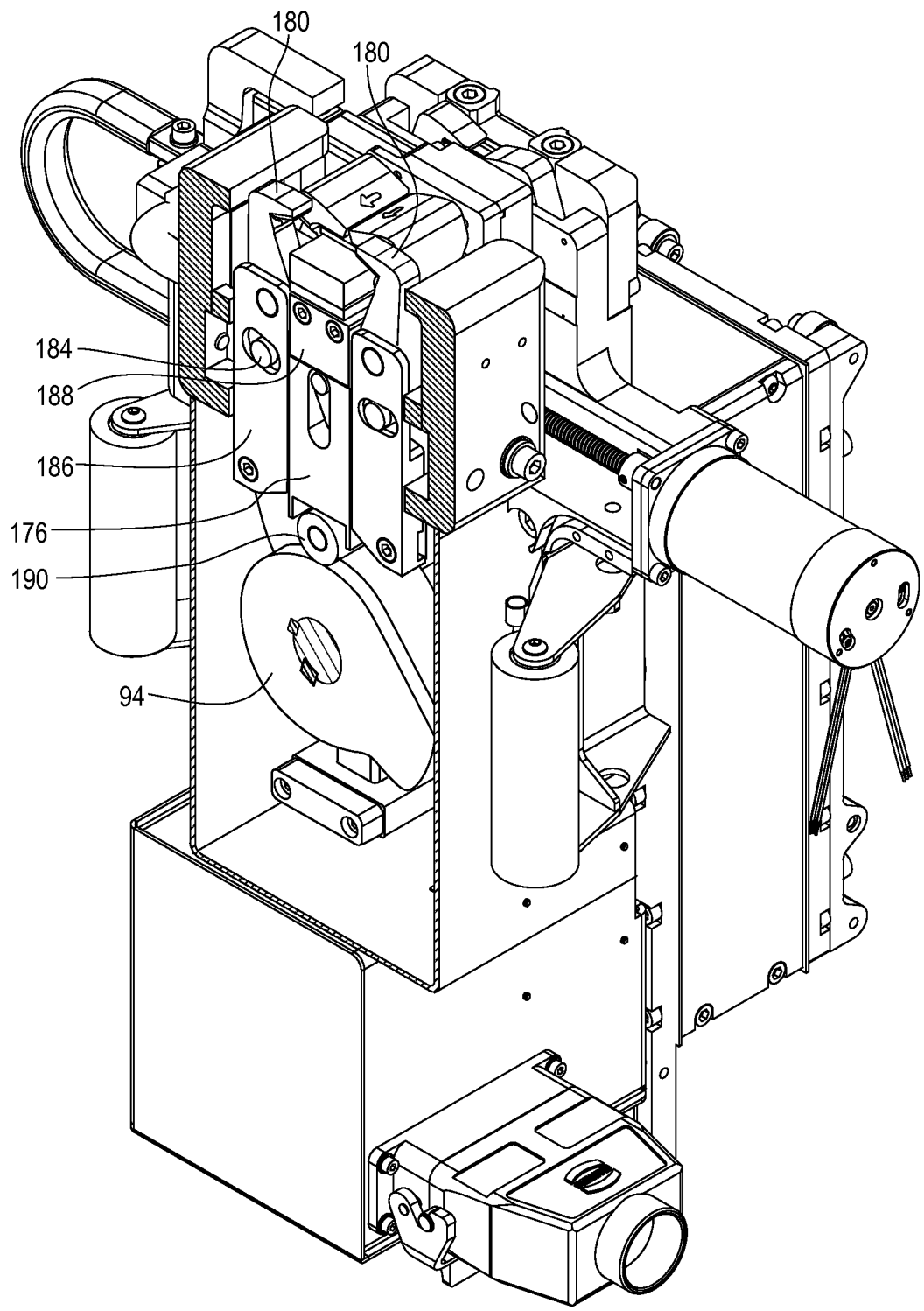
FIG. 29 is a sectional view through the spacer jaws.
Figure 30:
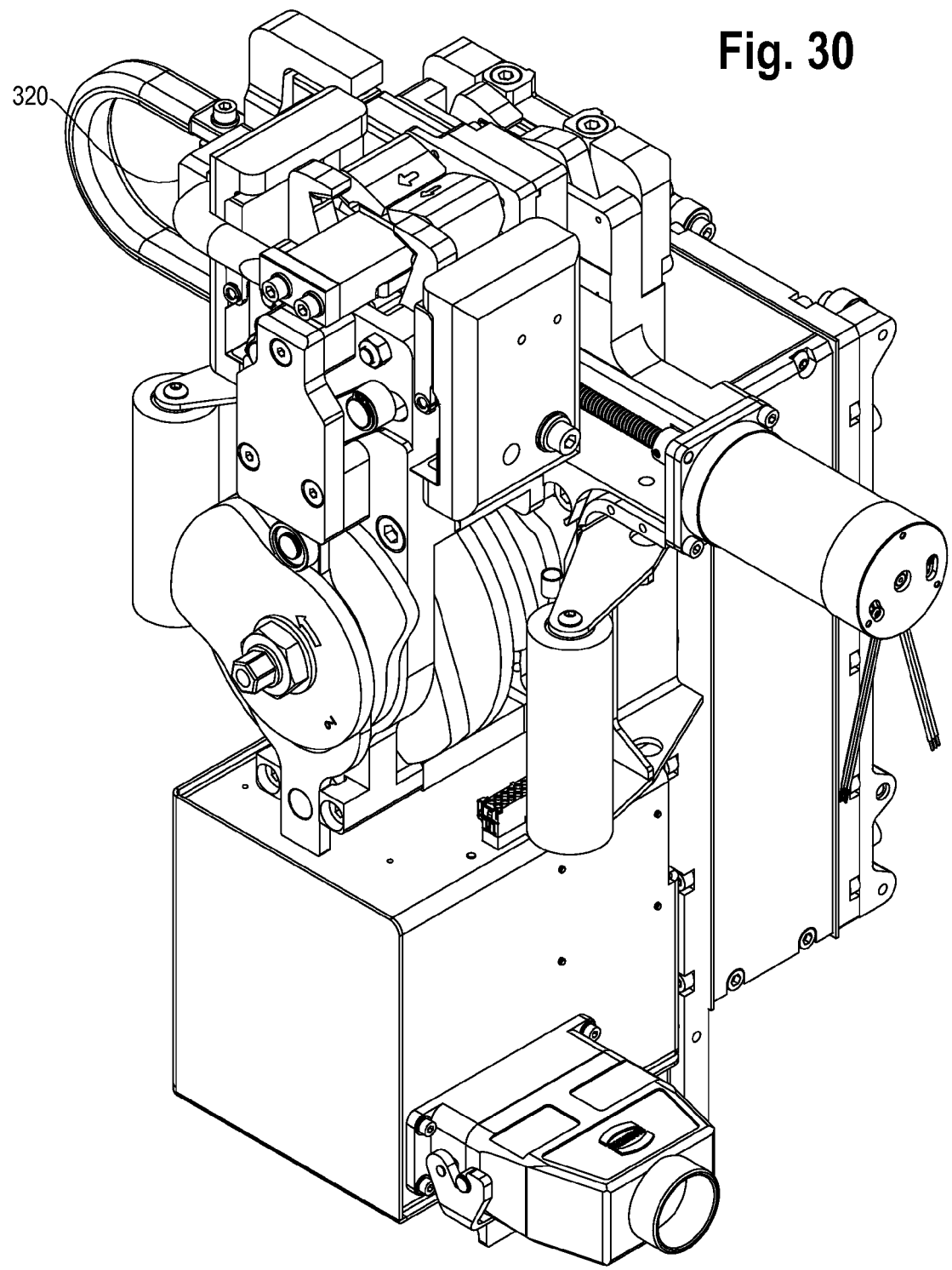
FIG. 30 is a sectional view adjacent to the grip clamp/cutter shuttle, illustrating the electrical conductors for the grip clamp side electrode.
Figure 31:
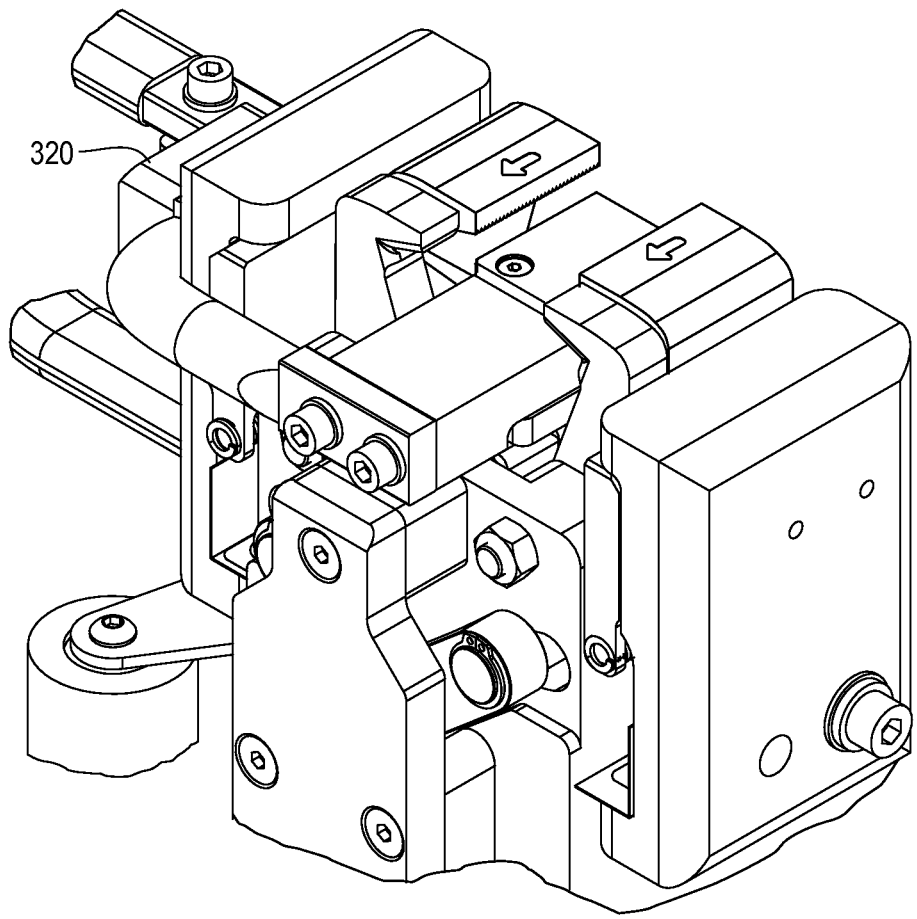
FIG. 31 is another perspective view of the electrical conductors for the grip clamp side electrode.
Figure 32:
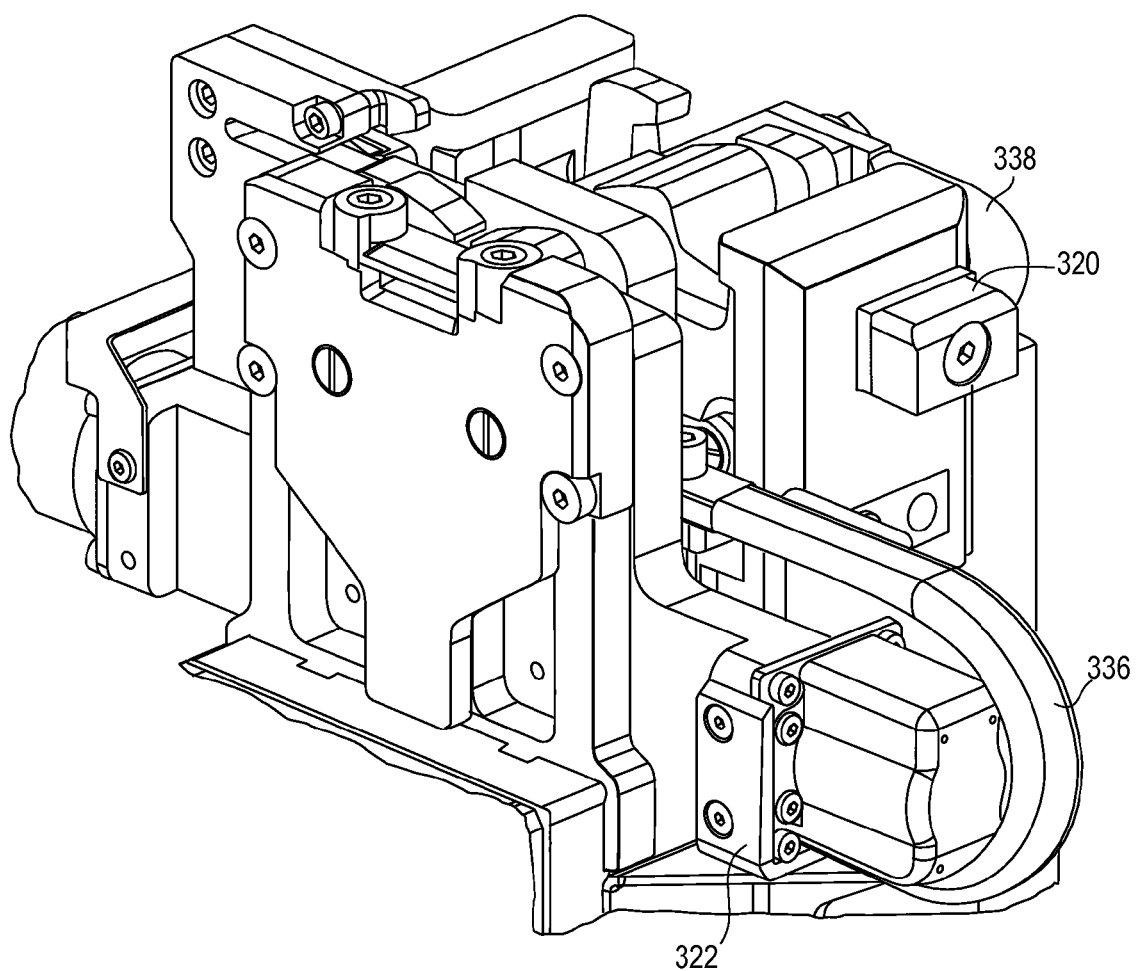
FIG. 32 is a perspective view showing the conductors for the loop grip side electrode.
Figure 33:
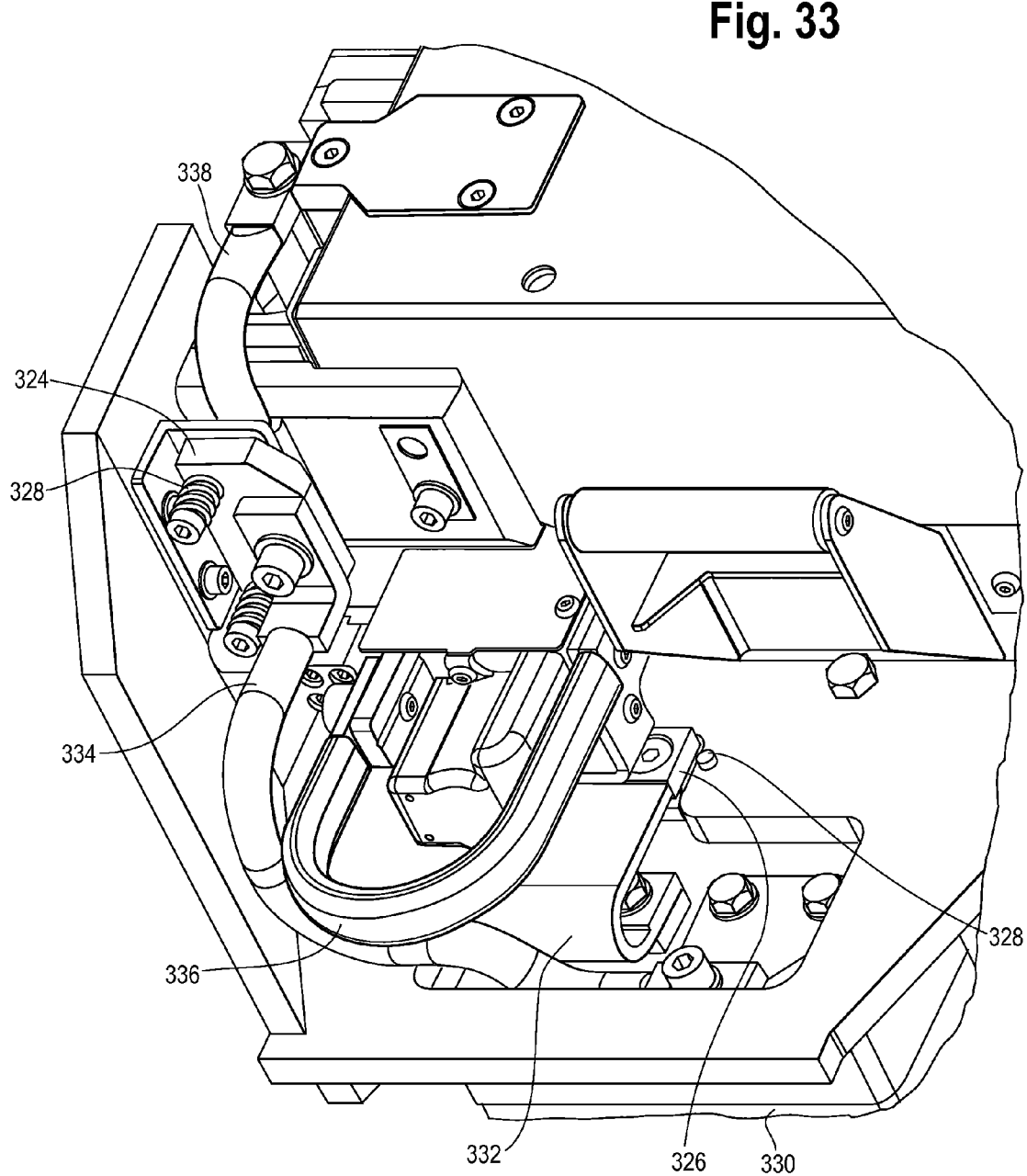
FIG. 33 illustrates the conductors and quick-disconnect portions of the conductors.
Figure 34:
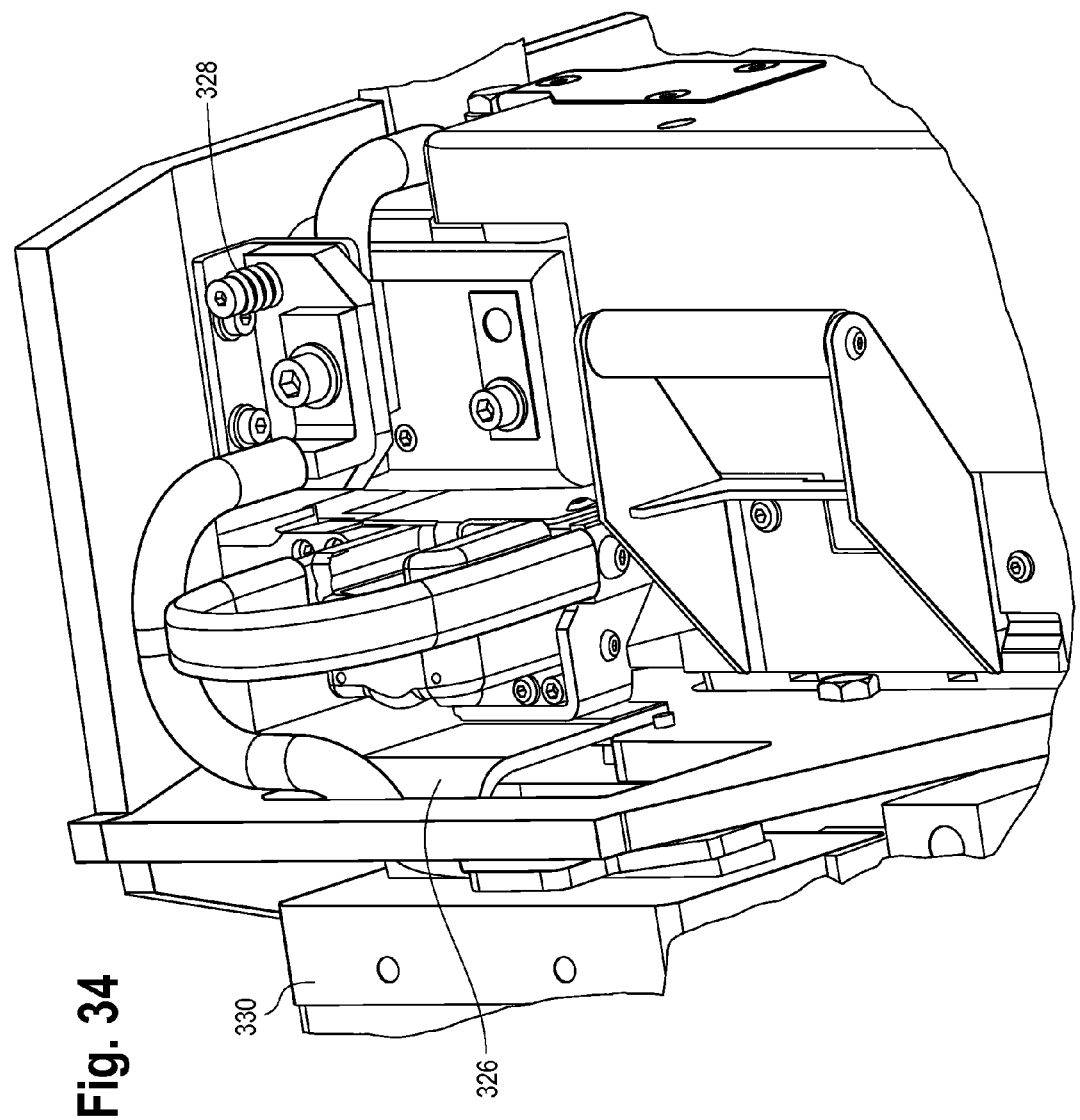
FIG. 34 illustrates the quick-disconnect elements on the machine frame.
Figure 36:
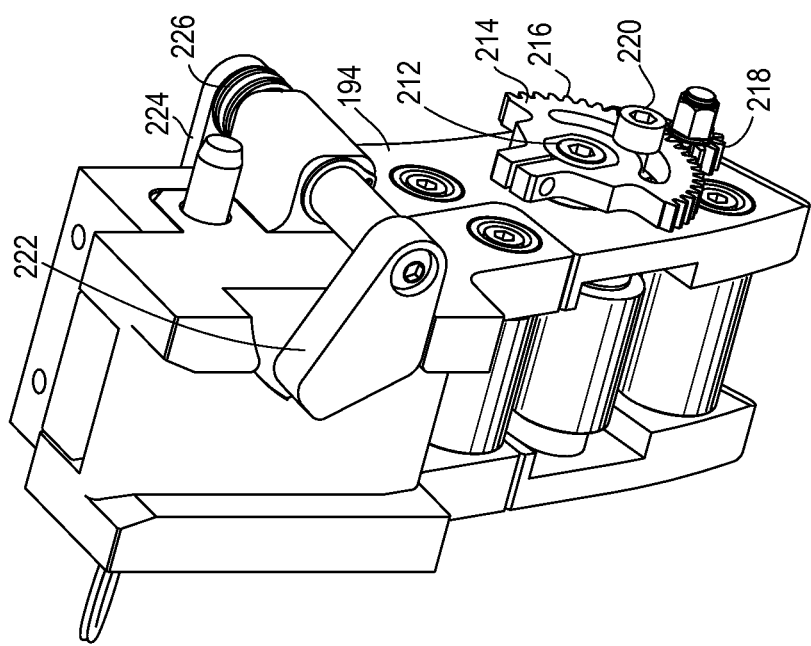
FIG. 36 is another perspective view of the strap straightener.
Figure 35:
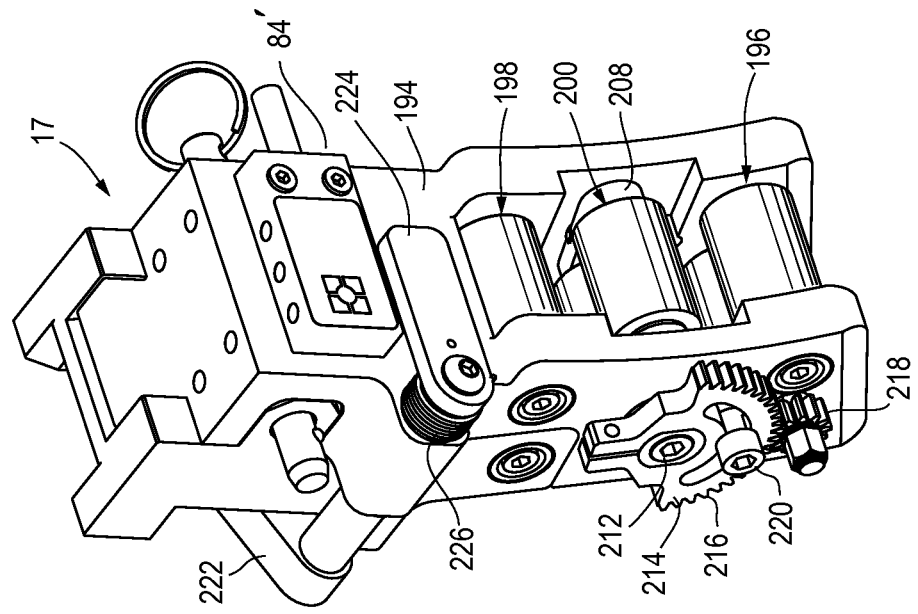
FIG. 35 is perspective view of the strap straightener.
Figure 38:
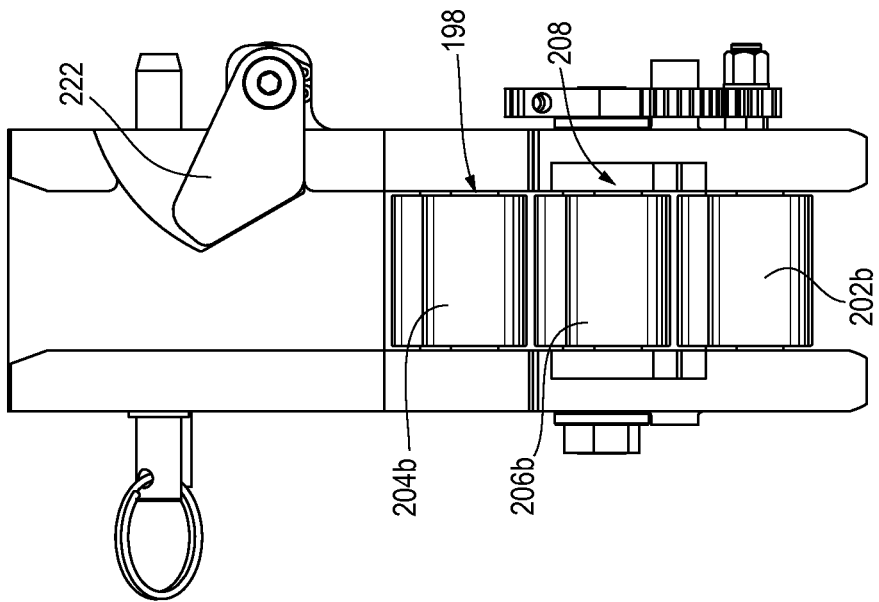
FIG. 38 is a side view of the strap straightener.
Figure 37:
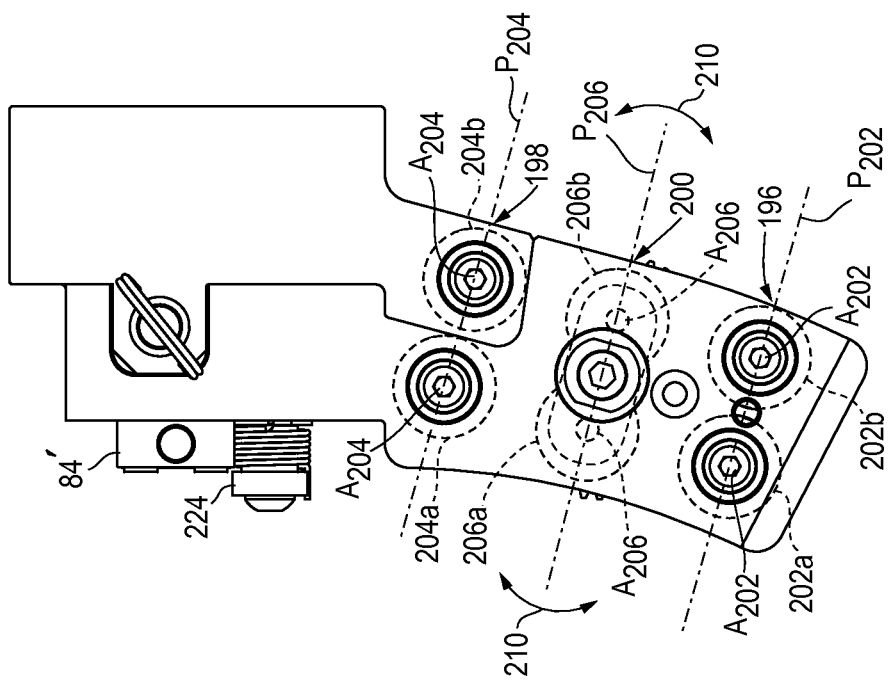
FIG. 37 is a front view of the strap straightener.

A pair of spacer jaws 180 are adjacent to the loop grip jaws 160, as seen in FIGS. 24 and 29. The spacer jaws 180 serve a guide function for the loop strap as it traverses through the sealing head 18. As such, the spacer jaws 180 do not bear down on the S strap, but define a gap 182 between the jaws 180 in the closed position and the loop grip anvil 162. The spacer jaws 180 have a pivoting configuration similar to that of the loop grip jaws 160. The spacer jaws 180 pivot about a pivot joint, such as the illustrated pivot pin 184. Link arms 186 extends from a lifter 188 mounted to a cam follower 190 to pivot the jaws 180. As the lifter 188 moves upwardly (following the cam follower 190) toward (but not into the strap path 92), the link arms 186 pivot the base of the jaws 180 outwardly which in turn pivots the jaws 180 inwardly toward the strap path 92.

In order to weld the strap ends to one another, as set forth above, two electrodes 138 and 156 are provided. One electrode 138 is provided on the grip clamp anvil 134 and the other electrode 156 is provided on loop grip anvil 162. The electrode 156 is electrically isolated from the sealing head 18 structure so that current is carried by (conducted through) the electrode 156, only. Accordingly, electrical isolation is provided at the loop grip electrode 156 by isolation elements 302, 304, 306, 308, 310, 312, 314, 316 and 318.

In order to enhance the modularity of the sealing head 18 and the machine 10, generally, connections to the sealing head electrodes 138 and 156 are of the quick-connect type. In such an arrangement, there are two electrical contacts 320 and 322 on the sealing head. These are made of a highly conductive material to minimize resistance and surface area requirements. They are positioned in such a way that when the sealing head 18 is installed on the machine 10, they nest with cooperating biased contacts 324 and 326. The contacts 324 and 326 can be biased, as illustrated, by springs 328. The contacts 324 and 326 are connected to a weld transformer 330 via a shunt 332 and cable 334. Electrical contact 320 connects to the loop grip anvil 162 via cable 338. Electrical contact 322 connects to the grip clamp 118 via cable 336.

In operation, the leading end of the strap S enters the feed head 14 from the dispenser and is conveyed to the tension head 16 by the feed head 14. A transition guide 192 extends from the tension head 16 to the sealing head 18 and provides the curved or arcuate guide for the strap S from the tension head 16 to the sealing head 18.

As the leading end of the strap S is fed into the sealing head 18, the end grip jaws 100 are open, the cutter shuttle 116 is in the intermediate or home position, the loop grip jaws 160 are open and the spacer jaws 160 are open. The end grip and loop grip anvils 102 and 162 are in their retracted positions.

The leading end of the strap S passes through the sealing head 18 and traverses through the chute 20, the feed limit assembly 74, and back to the sealing head 18. The leading end of the strap S is sensed by the feed limit assembly sensor 74, which signals (through the controller 22) to the feed head 14 that the feed cycle is nearing completion. The feed limit assembly drive 76 is actuated (or it may be running previously) to urge the leading end of the strap into the sealing head 18. The leading end is stopped by stop surface 152, the end grip jaws 100 close on the leading end and the spacer jaws 180 close over (but do not bind on) the loop portion of the strap S to form a guide for the loop portion.

The feed head 14 then operates in reverse to draw the strap S from chute 20 onto the load in a take-up cycle. Once the strap S is sensed to be on the load (for example, by the feed head drive 24 stalling out in the reverse direction), the tension head 16 operates to draw tension in the strap S. When a desired tension is reached, the tension head 16 operates in brake mode to hold strap S tension. The loop grip jaws 160 close on the strap S to grip the strap S and the tension head drive 36 turns off. The spacer jaws 180 then open.

The grip clamp/cutter shuttle 116 moves from the home position to the cut position and the loop strap is cut with a small gap (e.g., about ½ mm) between the strap leading end and the cut loop end. The strap S is now ready for welding, and the shuttle 116 moves to the welding position. The grip clamp 124 slides over the loop end of the strap and the grip clamp anvil 134 moves up to clamp the strap S between the grip clamp 118 and the electrode 138 on the grip clamp anvil 134.

The weld transformer turns on and the wedge element 176 begins to move upwardly to engage the wedge surface 174 (on the carriage 158) to move the loop grip carriage 158 longitudinally toward the end grip 96 and the strap leading end. For about half of the longitudinal movement, the carriage 158 moves slowly and the strap S is heated. For about the second half of the longitudinal movement, the transformer turns off, and the loop cut end of the strap, which is heated, moves quickly into the leading end to fuse the strap ends to one another. The overall movement of loop grip carriage is about 6 mm over a period of about 2 seconds. The weld is completed upon completion of the movement of the loop grip carriage 158.

After the weld cycle, following a predetermined period of time, the end grip 102 anvil moves downward away from the end grip jaws 100 and the end grip jaws 100 open, the grip clamp anvil 134 is returned to the retracted position (by spring 136) and the grip clamp/cutter shuttle 116 returns to the home position. The loop grip anvil 162 moves downward away from the loop grip jaws 160 and the loop grip jaws 160 open, and the strapped load is moved or removed from the strapping machine. The machine is then ready for a subsequent strapping cycle.

It will be appreciated by those skilled in the art that the relative directional terms such as upper, lower, rearward, forward and the like are for explanatory purposes only and are not intended to limit the scope of the disclosure.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A sealing head for a strapping machine for feeding a steel strapping material around a load, tensioning the strapping material and welding the strapping material to itself in an end-to-end weld, the strapping material conveyed along a strap path, the sealing head comprising:
    a body;
    a drive;
    an end grip disposed at about an inlet to the body;
    a cutter;
    an anvil;
    a shuttle configured to move transverse to the strap path;
    a grip clamp; and
    a loop grip disposed downstream of the end grip, the loop grip carried on a loop grip carriage, the loop grip carriage movable in a direction along the strap path,
    wherein a leading end of strapping material is secured by the end grip, a loop portion of the strap is gripped by the loop grip and severed by the cutter to form a loop end of the strapping material, the loop end being secured by the grip clamp, wherein the loop grip carriage moves the loop end toward the leading end as current is passed though the loop end and the leading end to weld the loop end and leading end to one another in an end-to-end weld, and wherein the cutter and the grip clamp are carried on the shuttle.

2. The sealing head of claim 1 including a cam shaft operably coupled to the drive, and wherein the end grip, cutter, grip clamp, loop grip and loop grip carriage are operably connected to the cam shaft.

3. The sealing head of claim 1 wherein the end grip includes a pair of end grip jaws moveable toward and away from the strap path.

4. The sealing head of claim 1 wherein the loop grip includes a pair of loop grip jaws movable toward and away from the strap path.

5. The sealing head of claim 1 including a weld electrode carried on the loop grip carriage.

6. The sealing head of claim 1 including a grip clamp anvil cooperating with the grip clamp, and wherein the grip clamp includes a weld electrode carried thereon.

7. The sealing head of claim 2 including first and second wedge elements, the first wedge element operably connected to the cam shaft and the second wedge element operably connected to the loop grip carriage, the first and second wedge elements cooperating with one another to move the strapping material loop end toward the leading end.

8. The sealing head of claim 1 including a first weld electrode carried on the loop grip carriage, a second weld electrode carried on the grip clamp, and a weld transformer, wherein connections between the weld transformer and the first and second electrodes, respectively, are quick disconnect connections.

9. A sealing head for welding first and second ends of a section of strapping material to one another in an end-to-end weld to form a loop as the strap is under tension, the strap loop defining a strap direction, the sealing head comprising:
    a body;
    an end grip disposed at about an inlet to the body;
    a cutter;
    a shuttle configured to move transverse to the strap direction;

a grip clamp and grip clamp anvil cooperating with one another to grip the first end, the grip clamp including a weld electrode carried thereon; and a loop grip carried on a loop grip carriage, the loop grip and loop grip carriage cooperating to grip the second end, the loop grip carriage movable parallel to the strap direction, the loop grip carriage carrying a weld electrode thereon, wherein the loop grip carriage moves the second end toward the first end as current is passed though the electrodes to weld the first and second ends to one another in an end-to-end weld, and wherein the cutter and the grip clamp are carried on the shuttle.

10. The sealing head of claim 9 wherein the end grip disposed upstream of the grip clamp.

11. The sealing head of claim 9 wherein the loops grip includes a pair of loop grip jaws operably mounted to the loop grip carriage for securing the second end in the loop grip.

12. The sealing head of claim 9 wherein the end grip having a pair of end grip jaws for securing the first end upstream of the grip clamp.

13. The sealing head of claim 11 including a pair of spacer jaws disposed downstream of the loop grip jaws.

14. The sealing head of claim 9 including a drive and a cam shaft operably connected to the drive, the cam shaft configured for cooperation with the grip clamp anvil, loop grip and loop grip carriage to grip and release the first and second ends, respectively.

15. The sealing head of claim 14 including first and second wedge elements, the first wedge element operably connected to the cam shaft and the second wedge element operably connected to the loop grip carriage, the first and second wedge elements cooperating with one another to move the strapping material second end toward the first end during welding.

16. The sealing head of claim 9 including a weld transformer, and further including quick disconnect connections between the weld transformer and the loop grip weld electrode and between the weld transformer and the grip clamp weld electrode.

17. The sealing head of claim 9 including a drive for moving the shuttle transverse to the strap direction.

* * * * *

UNITED STATES PATENT AND TRADEMARK OFFICE
CERTIFICATE OF CORRECTION

| | | |
|---|---|---|
| PATENT NO. | : 8,720,326 B2 | Page 1 of 1 |
| APPLICATION NO. | : 13/837820 | |
| DATED | : May 13, 2014 | |
| INVENTOR(S) | : Dustin D. Elliott et al. | |

It is certified that error appears in the above-identified patent and that said Letters Patent is hereby corrected as shown below:

In the Specification

In Column 10, line 62, "160" to read as --180--.

In Column 11, line 24, "124" to read as --118--.

In the Claims

In Column 13, line 14, Claim 11, "loops" to read as --loop--.

Signed and Sealed this
Twenty-fourth Day of February, 2015

Michelle K. Lee
*Deputy Director of the United States Patent and Trademark Office*